ized by a "rigid backbone," and display an unusual combination of physical properties, namely, solubility, high melting point, and excellent thermal, chemical and light stability.

United States Patent Office 3,330,815
Patented July 11, 1967

3,330,815
NOVEL POLYNORBORNENES, PROCESS FOR PRODUCTION THEREOF, AND PRODUCTS PRODUCED THEREFROM
James E. McKeon and Paul S. Starcher, Charleston, W. Va., assignors to Union Carbide Corporation, a corporation of New York
No Drawing. Filed Mar. 24, 1964, Ser. No. 354,423
40 Claims. (Cl. 260—93.1)

This invention relates to novel polymers of substituted and unsubstituted norbornenes and to a process for producing the same. More particularly, this invention relates to homopolymers and interpolymers of substituted and unsubstituted norbornenes which are composed of repeating structural units comprising a bicycloheptanylene radical with the structural units joined directly to one another at the 2-position and 3-position carbon atoms of the bicycloheptanylene radical and to a process for producing such polymers utilizing palladium compounds as catalysts. In particular aspects, the invention is directed to the use of certain of these novel polynorbornenes to produce polyurethane foams, pour point depressants, and alkyd coatings resins having superior properties to related products known to the art and encompasses such products as novel compositions of matter.

Processes for polymerizing norbornenes (bicyclo[2.2.1]hept-2-enes) are well known. However, in all of the prior art processes polymerization proceeds by ring scission to yield a solid unsaturated polymer having recurring cyclopentanylvinylene units of the formula

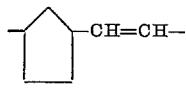

or analogous ring-substituted cyclopentanylvinylene units in the polymer chain. One such process, disclosed in United States Patents 2,721,189 and 2,932,630, and further discussed in a paper by W. L. Truett et al., J. Am. Chem. Soc., 82, 2337 (1959), utilizes a Ziegler catalyst comprising a titanium compound in which the titanium has been reduced to a valence state below 3 by a suitable reducing agent such as a metal alkyl. A related process, employing similar coordination catalysts, is that of British Patent 863,373. Still another process, disclosed in British Patent 867,636, employs a polymerization catalyst comprising an admixture of stannic chloride and an aluminum alkyl compound to produce solid poly(bicyclo[2.2.1]hept-2-enes) with high melting points. Still another process for polymerizing bicyclo[2.2.1]hept-2-enes is that of United States Patent 3,074,918 wherein the polymerization catalyst is a Group VI–B metal oxide, such as molybdenum oxide, supported on a difficulty reducible metal oxide carrier, such as alumina, in combination with a hydride of a metal of Groups I to III, for example, lithium aluminum hydride.

It has now been discovered that substituted and unsubstituted bicyclo[2.2.1]hept-2-enes can be polymerized by the use of palladium compounds as polymerization catalysts. The palladium catalysts of this invention have been found to be specific for the bicycloheptene ring double bond so that other types of double bonds, for example vinyl or isopropylidene type double bonds, present in a substituted bicycloheptene monomer are not affected by the catalyst and are incorporated intact into the resulting polymer. The solid, high melting point polymers of the present invention are homopolymers of a single bicyclo[2.2.1]hept-2-ene monomer, substituted or unsubstituted, or interpolymers of two or more different bicyclo[2.2.1]hept-2-ene monomers and are composed of repeating structural units which comprise a bicycloheptanylene radical, the structural units being joined directly to one another without intermediate linkages at the 2-position and 3-position carbon atoms of the bicycloheptanylene radical and are thus structurally and chemically different from the polymers of bicyclo[2.2.1]hept-2-enes produced or disclosed by the prior art. The novel polymers of the present invention form a unique class of polymeric compounds which are free of unsaturation in the chain, are character- The essential and characteristic feature of the polymers of this invention is the repeating structural unit comprising a bicycloheptanylene radical which makes up the polymer chain and the nature of the substituents on the bicyclo-heptanylene radical is of minor importance. The palladium catalysts disclosed herein are not affected by the presence of functional groups of widely differing type attached to the bicycloheptene ring so that it is intended to include within the scope of the present invention all polymers having the novel structure herein described regardless of the nature of the substituents on the structural units of the polymer chain. Accordingly, a very broad class of polyfunctional compounds having a wide range of uses, for example, as intermediates for production of surface coatings, polyurethane foams, epoxy resins, oil additives, and so forth, can be produced by the process of the present invention.

The basic structural unit of the bicyclo[2.2.1]hept-2-ene monomers and the numbering of the positions of the bicyclo-heptene ring are illustrated by the following structural formula:

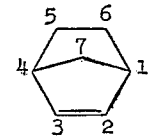

In bicyclo[2.2.1]hept-2-ene all carbon atoms are, of course, fully substituted by hydrogen atoms. The solid polymers of the present invention are composed of repeating structural units which comprise a bicycloheptanylene radical, said structural units being joined directly to one another at the 2-position and 3-position carbon atoms of the bicycloheptanylene radical, and said bicycloheptanylene radical having hydrogen atoms attached to the 2-position and 3-position carbon atoms thereof and at least 4 hydrogen atoms attached to the remaining carbon atoms thereof. The solid polymers can thus be polymers of bicyclo[2.2.1]hept-2-ene or of one or more substituted bicyclo[2.2.1]hept-2-ene monomers having from 1 to 4 substituted positions on the bicycloheptene ring but being free of substituents at the 2 and 3 positions. Accordingly, the repeating unit of the polymer chain of the novel polynorbornenes of this invention can be represented by the formula:

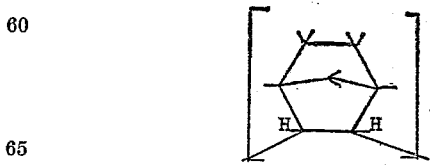

wherein up to four of the eight free valences shown are attached to organic or inorganic radicals independently or in combination, as hereinafter described in greater detail.

According to the present invention, bicyclo[2.2.1]hept-2-enes are polymerized by contacting them with minor amounts of a compound of palladium. A possible explanation for the function of the palladium catalyst is that the palladium first forms a complex with the bicycloheptene monomer and then rearranges to form a palladium alkyl which is the true catalytic species; however, applicants do not wish to be bound by any theoretical explanations for the function of the palladium catalysts of this invention. In any event, it has been found that the polymerization can be carried out in such a manner that the catalytically active species is formed in situ by the interaction of the bicycloheptene monomer and the palladium compound or by reacting the bicycloheptene monomer and the palladium compound to form an active catalyst complex and then employing this catalyst complex to catalyze the polymerization of further bicycloheptene monomer. Both homopolymers of bicyclo[2.2.1]hept-2-enes and interpolymers formed by copolymerizing two or more different bicyclo[2.2.1]hept-2-ene monomers can be produced by the process of this invention, and the term "polymer" is used herein, and in the appended claims, to denote both of these possibilities.

As hereinbefore indicated, the essential and critical feature of the present invention resides in the structure of the polymer, that is, a polymer chain of bicycloheptanylene or substituted bicycloheptanylene radicals polymerized at the 2 and 3 positions, and the nature of the substituents on the bicycloheptanylene radical is not of importance. The invention thus comprehends a broad class of polymers, all composed of repeating structural units comprising a bicycloehptanylene radical, but having up to 4 substituents on tthe bicycloheptanylene radical at the positions hereinbefore indicated. The substituents can, for example, be any radical or group of atoms, either organic or inorganic, composed of one or more of the elements carbon, hydrogen, oxygen, nitrogen, phosphorus, sulfur, silicon, boron, fluorine, chlorine, bromine, and iodine. Any desired poly(bicyclo[2.2.1]hept-2-ene) can be produced by polymerizing the corresponding bicyclo[2.2.1]hept-2-ene monomer, preferably employing a monomer having a molecular weight of less than about 500, or by polymerizing said monomer and then carrying out further chemical transformations of the resulting polymer as will be hereinafter described. As used herein, and in the appended claims, the terms "bicyclo[2.2.1]hept-2-enes" and "bicyclo[2.2.1]hept-2-ene monomer" are taken in a generic sense to means unsubstituted bicyclo[2.2.1]hept-2-ene, substituted bicyclo[2.2.1]hept-2-enes, and monomers containing the bicyclo[2.2.1]hept-2-ene ring system.

Among the bicyclo[2.2.1]hept-2-enes that can be polymerized by the process of this invention are bicyclo[2.2.1]hept-2-enes substituted by up to 4 monovalent hydrocarbyl groups, each of which can contain up to about 20 carbon atoms, at any of positions 1, 4, 5, 6 or 7. By the term "hydrocarbyl group" as used herein is meant an alkyl radical, an aryl radical, an alkenyl radical, an alkaryl radical, an aralkyl radical, a cycloalkyl radical, or a cycloalkenyl radical. Illustrative of suitable bicyclo[2.2.1]hept-2-enes within this class one can mention:

1-methylbicyclo[2.2.1]hept-2-ene,
5-methylbicyclo[2.2.1]hept-2-ene,
7-methylbicyclo[2.2.1]hept-2-ene,
5-(2-ethylhexyl)-bicyclo[2.2.1]hept-2-ene,
1-pentadecylbicyclo[2.2.1]hept-2-ene,
5,5-dimethylbicyclo[2.2.1]hept-2-ene,
5,5-dibutylbicyclo[2.2.1]hept-2-ene,
5,7-dibutylbicyclo[2.2.1]hept-2-ene,
5-methyl-5-ethylbicyclo[2.2.1]hept-2-ene,
5,6-didodecylbicyclo[2.2.1]hept-2-ene,
5-ethyl-6-propylbicyclo[2.2.1]hept-2-ene,
5,5,6,6-tetramethylbicyclo[2.2.1]hept-2-ene,
1-phenylbicyclo[2.2.1]hept-2-ene,
5-naphthylbicyclo[2.2.1]hept-2-ene,
5,5-diphenylbicyclo[2.2.1]hept-2-ene,
5-vinylbicyclo[2.2.1]hept-2-ene,
7-vinylbicyclo[2.2.1]hept-2-ene,
5-propenyl-6-methylbicyclo[2.2.1]hept-2-ene,
5-tolylbicyclo[2.2.1]hept-2-ene,
5-benzylbicyclo[2.2.1]hept-2-ene,
5-cyclopentylbicyclo[2.2.1]hept-2-ene,
1,5,5-trimethylbicyclo[2.2.1]hept-2-ene,
5-isopropenylbicyclo[2.2.1]hept-2-ene,
1-isopropylbicyclo[2.2.1]hept-2-ene,
1-ethylbicyclo[2.2.1]hept-2-ene,
1,5-dimethylbicyclo[2.2.1]hept-2-ene,
1,5-dimethylbicyclo[2.2.1]hept-2-ene,
1,6-dimethylbicyclo[2.2.1]hept-2-ene,
5,5,6-trimethylbicyclo[2.2.1]hept-2-ene,
5-cyclopropylbicyclo[2.2.1]hept-2-ene,
5-cyclohexylbicyclo[2.2.1]hept-2-ene,
5-cyclopentenylbicyclo[2.2.1]hept-2-ene, and the like.

Further illustrative of bicyclo[2.2.1]hept-2-enes that can be polymerized by the process of this invention are bicyclo[2.2.1]hept-2-enes substituted at any of positions 1,4,5,6 or 7 by up to 4 monovalent non-hydrocarbonaceous radicals, that is radicals not composed solely of carbon and hydrogen but containing one or more of the elements oxygen, nitrogen, phosphorus, sulfur, silicon, boron, fluorine, chlorine, bromine, or iodine. Some of the many suitable substituents of this type are those represented by the formulae below:

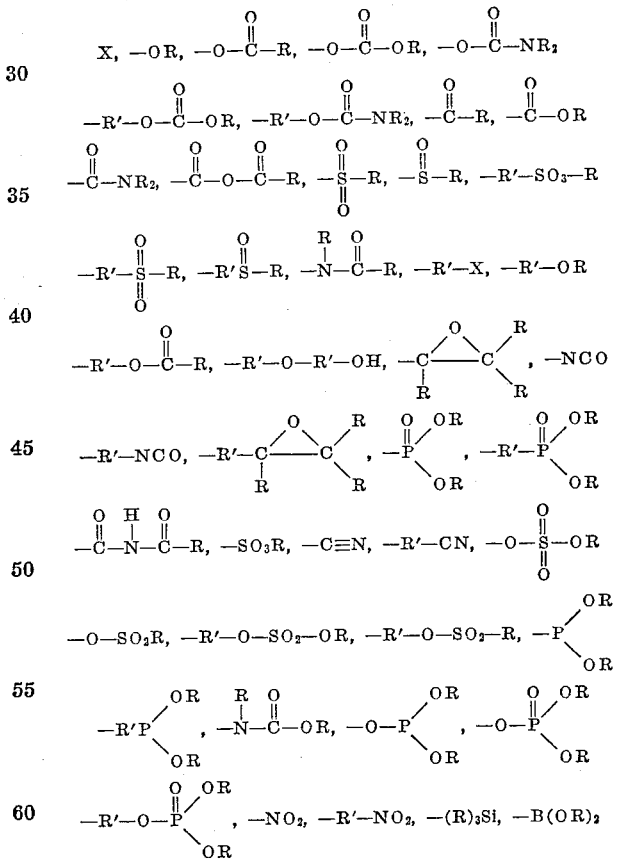

wherein X represents a halogen atom, R' is an alkylene group and R is a hydrogen atom or an alkyl group. Illustrative of a few of the many bicyclo[2.2.1]hept-2-enes of this class one can mention:

7-bromobicyclo[2.2.1]hept-2-ene,
5-iodobicyclo[2.2.1]hept-2-ene,
5,6-dichlorobicyclo[2.2.1]hept-2-ene,
5,7-difluorobicyclo[2.2.1]hept-2-ene,
5,5,6-trichlorobicyclo[2.2.1]hept-2-ene,
5,6-dicyanobicyclo[2.2.1]hept-2-ene,
5-chloro-6-isocyanatobicyclo[2.2.1]hept-2-ene,
5-hydroxybicyclo[2.2.1]hept-2-ene,
5,6-dihydroxybicyclo[2.2.1]hept-2-ene, 5,7-dihydroxybicyclo[2.2.1]hept-2-ene,
5-methoxy-6-ethoxybicyclo[2.2.1]hept-2-ene,
bicyclo[2.2.1]hept-5-en-2-yl formate,
bicyclo[2.2.1]hept-5-en-2-yl acetate,
bicyclo[2.2.1]hept-5-en-2-yl propionate,
bicyclo[2.2.1]hept-5-en-2-yl pentanoate,
ethylbicyclo[2.2.1]hept-2-en-5-carboxylate,
hexyl bicyclo[2.2.1]hept-2-en-5-carboxylate,
bicyclo[2.2.1]hept-2-en-5-carboxamide,
N,N-dimethylbicyclo[2.2.1]hept-2-en-5-carboxamide,
5-chloromethylbicyclo[2.2.1]hept-2-ene,
5-hydroxymethylbicyclo[2.2.1]hept-2-ene,
5-hydroxybutylbicyclo[2.2.1]hept-2-ene,
5,6-di-(hydroxymethyl)-bicyclo[2.2.1]hept-2-ene,
5-chloro-6-isocyanatomethylbicyclo[2.2.1]hept-2-ene,
5,6-di-(cyanomethyl)-bicyclo[2.2.1]hept-2-ene,
bicyclo[2.2.1]hept-5-en-2-ylmethyl acetate,
bicyclo[2.2.1]hept-5-en-2-ylmethyl butyrate,
5-trichloromethylbicyclo[2.2.1]hept-2-ene,
N-(bicyclo[2.2.1]hept-5-en-2-yl)benzenesulfonamide,
5-hydroxy-7-isopropylidenebicyclo[2.2.1]hept-2-ene,
bicyclo[2.2.1]hept-2-ene-7-carboxylic acid,
7-hydroxybicyclo[2.2.1]hept-2-ene,
7-chlorobicyclo[2.2.1]hept-2-ene,
5-nitrobicyclo[2.2.1]hept-2-ene,
1-phenyl-5-nitrobicyclo[2.2.1]hept-2-ene,
1-(bicyclo[2.2.1]hept-5-en-2-yl)-2-propanone,
dimethyl(bicyclo[2.2.1]hept-5-en-2-yl)methyl phosphate,
3-(1,1-dioxotetrahydrothienyl)(5-bicyclo[2.2.1]hept-2-enyl)methyl ether,
5,6-dimethyl-5-nitrobicyclo[2.2.1]hept-2-ene,
1-methylbicyclo[2.2.1]hept-2-ene-5,6-dicarboxylic acid,
dimethyl 1-ethylbicyclo[2.2.1]hept-2-ene-5,6-dicarboxylate,
6-(bicyclo[2.2.1]hept-2-ene-5-carboxylic acid)phenyl sulfone,
5-(ethylsulfinyl)bicyclo[2.2.1]hept-2-ene,
5-(benzenesulfonyl)bicyclo[2.2.1]hept-2-ene-5-carboxylic acid,
5-(benzenesulfinyl)bicyclo[2.2.1]hept-2-ene-5-carboxylic acid,
5-(vinylsulfinyl)bicyclo[2.2.1]hept-2-ene,
5-(vinylsulfonyl)bicyclo[2.2.1]hept-2-ene,
dimethylbicyclo[2.2.1]hept-5-en-2-ylboronate,
5-allylbicyclo[2.2.1]hept-2-en-5-carbonitrile,
5-isopropylbicyclo[2.2.1]hept-2-en-5-carbonitrile,
bicyclo[2.2.1]hept-2-en-5,6-dicarboxylic acid anhydride,
bicyclo[2.2.1]hept-2-en-5,6-carboximide,
3-keto-4-oxatricyclo[5,2,1,0$^{2.6}$]dec-8-ene,
2-(3-methylbicyclo[2.2.1]hept-5-en-2yl)-1,3-dioxolane,
5-benzoylbicyclo[2.2.1]hept-2-ene,
5-nitro-6-phenylbicyclo[2.2.1]hept-2-ene,
3,3-dioxo-3-thiatricyclo[2.2.1]dec-8-ene,
bicyclo[2.2.1]hept-2-ene-5-carbonitrile,
bicyclo[2.2.1]hept-2-ene-5,6-dicarbonitrile,
5-isocyanatomethylbicyclo[2.2.1]hept-2-ene,
bicyclo[2.2.1]hept-2-ene-5-carboxylic acid,
5,5-dihydroxymethylbicyclo[2.2.1]hept-2-ene,
(bicyclo[2.2.1]hept-5-en-2-yl)propionic acid,
N-allylbicyclo[2.2.1]hept-2-en-5-carboxamide,
allyl bicyclo[2.2.1]hept-2-en-5-carboxylate,
(bicyclo[2.2.1]hept-5-en-2-yl)methyl chloroacetate,
allyl 5-methylbicyclo[2.2.1]hept-2-en-6-carboxylate,
3-(bicyclo[2.2.1]hept-5-en-2-yl)propionitrile,
allyl(bicyclo[2.2.1]hept-5-en-2-yl)methyl ether,
(bicyclo[2.2.1]hept-5-en-2-yl)methyl fumarate,
5-(1,2-dihydroxyethyl)bicyclo[2.2.1]hept-2-ene,
1-hydroxy-1-(bicyclo[2.2.1]hept-5-en-2-yl)cyclopentane,
(bicyclo[2.2.1]hept-5-en-2-yl)methylglycidyl ether,
(2-tetrahydrofuranyl)methyl bicyclo[2.2.1]hept-2-en-5-carboxylate,
trimethyl(bicyclo[2.2.1]hept-5-en-2-yl)methylsilane,
(bicyclo[2.2.1]hept-5-en-yl)methyl trifluoroacetate,
2-bromoethyl bicyclo[2.2.1]hept-2-en-5-carboxylate,
2-(bicyclo[2.2.1]hept-5-en-2-yl)oxirane,
5-(2-isocyanatoethyl)bicyclo[2.2.1]hept-2-ene,
5-chlorobicyclo[2.2.1]hept-2-en-5-carbonitrile,
2-(2-chloroethoxy)ethyl bicyclo[2.2.1]hept-2-en-5-carboxylate,
5-hydroxymethyl-6-methyl bicyclo[2.2.1]hept-2-ene,
(2-methylbicyclo[2.2.1]hept-5-en-2-yl)acetonitrile,
N-(bicyclo[2.2.1]hept-5-en-2-yl)pyrrolidinone,
and the like.

An additional class of substituted bicyclo[2.2.1]hept-2-enes which can be polymerized by the process of this invention are bicyclo[2.2.1]hept-2-enes wherein a divalent hydrocarbyl radical is attached to the carbon atom at any of positions 5, 6 or 7 of the bicycloheptene ring. particularly suitable divalent hydrocarbyl radicals are alkylidene groups of 1 to 10 carbon atoms, cycloalkylidene groups of 3 to 15 carbon atoms having 3 to 8 carbon atoms in the principal chain thereof, and cycloalkenylidene groups of 3 to 15 carbon atoms having 3 to 8 carbon atoms in the principal chain thereof. By the term "principal chain" as used herein is meant the carbon atom chain forming a cyclic moiety which is bonded to the bicycloheptene moiety. Thus, cyclic groups of 3 to 8 carbon atoms are contemplated but these cyclic groups can be substituted by one or more hydrocarbyl groups. Illustrative of suitable substituted bicyclo[2.2.1]hept-2-enes of this class one can mention:

5-methylenebicyclo[2.2.1]hept-2-ene,
5-ethylidenebicyclo[2.2.1]hept-2-ene,
5-propylidenebicyclo[2.2.1]hept-2-ene,
5-hexylidenebicyclo[2.2.1]hept-2-ene,
5-decylidenebicyclo[2.2.1]hept-2-ene,
5-methylene-6-methylbicyclo[2.2.1]hept-2-ene,
5-methylene-6-hexylbicyclo[2.2.1]hept-2-ene,
5-cyclohexylidenebicyclo[2.2.1]hept-2-ene,
5-cyclooctylidenebicyclo[2.2.1]hept-2-ene,
7-isopropylidenebicyclo[2.2.1]hept-2-ene,
5-chloromethyl-6-methylenebicyclo[2.2.1]hept-2-ene,
5-methyl-7-isopropylidenebicyclo[2.2.1]hept-2-ene,
5-hydroxymethyl-6-methylenebicyclo[2.2.1]hept-2-ene,
5-methylenebicyclo[2.2.1]hept-2-en-6-carboxylic acid,
7-ethylidenebicyclo[2.2.1]hept-2-ene,
5-methyl-7-propylidenebicyclo[2.2.1]hept-2-ene,
5-ethylidenebicyclo[2.2.1]hept-2-en-5-carbonitrile,
and the like.

Still a further class of substituted bicyclo[2.2.1]hept-2-enes that can be polymerized by the process of this invention are bicyclo[2.2.1]hept-2-enes wherein one bond on each of the carbon atoms at positions 5 and 6 of the bicycloheptene nucleus is joined to a divalent alicyclic moiety. The divalent alicyclic moiety can be monocyclic, bicyclic or tricyclic and can contain up to about 20 carbon atoms. Illustrative of suitable substituted bicyclo[2.2.1]hept-2-enes of this class one can mention:

endo-dicyclopentadiene,
exo-dicyclopentadiene,
tricyclo[6.2.1.0$^{2,7}$]undeca-4,9-diene,
tetracyclo[6.2.1.1$^{3,6}$0$^{2,7}$]dodec-4-ene,
9-methyltetracyclo[6.2.1.1$^{3,6}$.0$^{2,7}$]dodec-4-ene,
9-hydroxymethyltetracyclo[6.2.1.1$^{3,6}$.0$^{2,7}$]dodec-4-ene,
tetracyclo[6.2.1.1$^{3,6}$.0$^{2,7}$]dodec-4-ene-9-carboxylic acid,
tricyclo[7.2.1.0$^{2,8}$]dodec-10-ene,
tricyclo[8.2.1.0$^{2,9}$]tridec-11-ene,
4-methoxytricyclo[6.2.1.0$^{2,7}$]undeca-4,9-diene,
4-chlorotricyclo[6.2.1.0$^{2,7}$]undeca-4,9-diene,
4-acetoxytricyclo[6.2.1.0$^{2,7}$]undeca-4,9-diene,
tetracyclo[6.2.2.1$^{3,6}$]tridec-4-ene,
and the like.

Preferred among the bicyclo[2.2.1]hept-2-enes that can be polymerized by the process of this invention because of ease of preparation of the bicycloheptene monomer from simple, low cost starting materials are bicyclo[2.2.1]hept-2-enes substituted only at the 5 and/or 6 positions by relatively simple substituents each of which is composed of not more than about 15 atoms. The bicycloheptene monomers contemplated in this instance are compounds of the formula:

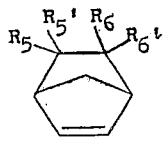

and correspondingly the polymers produced by polymerizing the above-defined monomers by the herein disclosed process are composed of polymerized bicycloheptanylene units of the formula

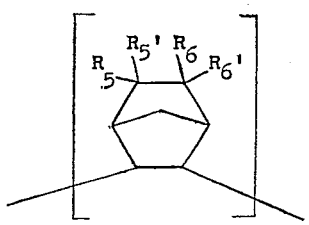

wherein $R_5$, $R_5'$, $R_6$, and $R_6'$ when taken singly are each members selected from the group consisting of a hydrogen atom, an alkyl radical, a halogen atom, a cyano group, an isocyanato group, a hydroxyl group, an alkoxy group, a formyloxy group, an alkylcarbonyloxy group, a carboxy group, an alkoxycarbonyl group, a carbamoyl group, a dialkylaminocarbonyl group, a haloalkyl group, a hydroxyalkyl group, an epoxyalkyl group, a cyanoalkyl group, an isocyanatoalkyl group, and an alkylcarbonyloxyalkyl group; $R_5$ and $R_5'$ when taken in combination are an alkylidene group of 1 to 10 carbon atoms, and $R_5$ and $R_6$ when taken in combination form a cyclic hydrocarbyl group of 3 to 5 carbon atoms fused to the bicycloheptene ring system.

The substituted bicyclo[2.2.1]hept-2-ene monomers hereinbefore described can be prepared by known procedures as generally set forth in "Organic Reactions," vols. IV and V, John Wiley & Sons, Inc. (1952). Thus, the substituted bicyclo[2.2.1]hept-2-enes can be prepared by Diels-Alder type reactions of cyclopentadiene or substituted cyclopentadienes with suitable dienophiles. For example, 5-methylenebicyclo[2.2.1]hept-2-ene can be prepared by the condensation of cyclopentadiene with propadiene and 5-hydroxymethylbicyclo[2.2.1]hept-2-ene can be prepared by reaction of cyclopentadiene with allyl alcohol. If the proper dienophile is not readily available for the synthesis of a particular bicyclo[2.2.1]hept-2-ene monomer, then cyclopentadiene can be reacted with a simpler dienophile and further chemical transformations can then be carried out on the resulting Diels-Alder adduct. For example, the adduct of cyclopentadiene and allylamine can be converted to the hydrochloride and treated with phosgene to yield the corresponding isocyanate.

The polymers of this invention are not limited to poly(bicyclo[2.2.1]hept-2-enes) that can be readily prepared by direct polymerization of the corresponding bicyclo[2.2.1]hept-2-ene monomer. Thus, where production of a particular poly(bicyclo[2.2.1]hept-2-ene) is difficult to accomplish because the corresponding bicyclo [2.2.1]hept-2-ene monomer is not readily polymerizable by the palladium catalysts of this invention, as is the case with bicyclo[2.2.1]hept-2-ene substituted by amino or formyl groups, then a related poly(bicyclo[2.2.1]hept-2-ene) can be prepared and further chemical transformations carried out to give the desired polymer. Thus, for example, poly(5 - aminomethylbicyclo[2.2.1]hept-2-ene) can be prepared by catalytic hydrogenation of poly(bicyclo[2.2.1]hept-2-en-5-carbonitrile) or base catalyzed hydrolysis of poly(N-acetyl-5-methylaminobicyclo[2.2.1] hept-2-ene) and poly (5-formyl-5-methylbicyclo[2.2.1] hept-2-ene) can be prepared by hydrolysis of poly(bicyclo[2.2.1]hept-2-en-5-carboxaldehyde diethyl acetal).

Similarly, where the repeating bicycloheptenylene units of the desired poly(bicyclo[2.2.1]hept-2-ene) are substituted by relatively high molecular weight substituents so that the corresponding substituted bicyclo[2.2.1]hept-2-ene monomer would exceed the preferred molecular weight hereinbefore disclosed, and in consequence could be difficult to polymerize, then a simpler poly(bicyclo [2.2.1]hept-2-ene) can be prepared and further chemical transformations carried out. Thus, for example, high molecular weight polymers wherein the polymer chain consists of repeating acyl-substituted bicycloheptanylene units can be prepared by polymerizing a bicyclo[2.2.1] hept-2-ene monomer substituted with one or more hydroxyalkyl groups to produce a poly(hydroxyalkylbicyclo [2.2.1]hept-2-ene) and then esterifying this polymer with, for example, a long chain fatty acid.

According to the present invention, polymerization of the hereinbefore described substituted and unsubstituted bicyclo[2.2.1]hept-2-enes is carried out in the presence of a catalytic amount of a compound of palladium. The essential characteristic of the catalysts that are effective in the process of this invention is that they contain palladium in an oxidation state in which it is capable of forming $DSP^2$ (square planar) hybrid orbitals. The preferred catalysts are compounds of palladium(II).

Any of a very broad class of compounds which contain palladium in the proper oxidation state can be employed to furnish the active catalyst species in the process of this invention, providing only that said compounds are capable of forming a substantially homogeneous phase with the reaction medium under the operative conditions of the process. Thus, the palladium-containing compound can be soluble in the polymerizable bicycloheptene monomer or if partially or totally insoluble in said bicycloheptene monomer then a suitable co-solvent, inert with respect to the bicycloheptene monomer, can be employed to bring about the required homogeneity.

The moiety which is bonded to the palladium to form a compound which is soluble in the reaction medium and which will provide the essential catalytic species, that is palladium in the hereinbefore described suitable oxidation state, upon addition to the reaction medium can be selected from a wide group of ions and neutral ligands. Illustrative of the ions which can be bonded to the palladium are the halide ions; the hydride ion; the carbanions, e.g., alkyl anion, phenyl anion, and the like; the cyclopentadienylide anions; the π-allyl groupings; the enolates such as the enolates of β-dicarbonyl compounds, e.g., acetylacetonates and the like; the anions of acidic oxides of carbon (carboxylate, carbonate, etc.), nitrogen (nitrate, nitrite, etc.), phosphorus (phosphate, phosphite, phosphine, etc.), bismuth (bismuthate, etc.), aluminum (aluminate, etc.), silicon (silicate, etc.), sulfur (sulfate, sulfite, etc.), molybdenum (molybdates, etc.), and the like, in which one valence of the central atom of the acidic oxide may be attached to carbon, and/or in which one of the oxygen atoms may be attached to carbon; protons and other positive ions, e.g. $Na^+$, $K^+$, $Ca^{++}$; and the like.

Illustrative of suitable neutral ligands which can be bonded to palladium are, among others, the olefins; the acetylenes; the acetylenic olefins; carbon monoxide; nitric oxide; nitrogen compounds, e.g. ammonia, pyridines, amines, amides, imides, ureas, nitriles, and the like; the organic ethers, e.g., dimethyl ether of diethylene glycol, dioxane, tetrahydrofuran, furan, diallyl ether, and the like; the phosphines, e.g. the alkylphosphines, the arylphosphines, the alkarylphosphines, and the like, and analogous compounds of antimony, arsenic, and bismuth; the phosphites, e.g. the alkylphosphites, the arylphosphites, the alkarylphosphites, and the like; the phosphine oxides, the phosphorus halides, the phosphorus oxyhalides; the sulfoxides, e.g. alkylsulfoxides, arylsulfoxides, alkarylsulfoxides, and the like.

Illustrative of suitable compounds which can be employed as catalyst one can mention:
dibromo bis(benzonitrile)palladium,
dichloro bis(dimethylsulfoxide)palladium,
dichloro(endo-dicyclopentadiene)palladium,
tetrachloro bis(bicyclo[2.2.1]hept-2-ene)palladium,
tetrachloro bis(5-hydroxymethylbicyclo[2.2.1]hept-2-ene)palladium,
dibromo bis(tetrahydrofuran)palladium,
dinitrato bis(benzonitrile)palladium,
bis(2,4-pentandionato)palladium,
palladium dichloride,
palladium dibromide,
palladium sulfate,
dichloro(cycloocta-1,5-diene)palladium,
dichloro bis($\pi$-allyl)dipalladium,
palladium acetate,
diacetato bis(benzonitrile)palladium,
chloro($\pi$-allyl)(benzonitrile)palladium,
tetrachloro bis(ethylene)dipalladium,
palladium citrate,
dichloro bis(acetonitrile)palladium,
dichloro bis(triethylphosphine)palladium,
tetrachloro bis(triethylphosphine)dipalladium,
tetrachloro bis(carbonyl)dipalladium,
tetrachloro bis(bicyclo[2.2.1]hept-2-en-5-carbonitrile)dipalladium,
dichloro bis(triethylphosphite)palladium,
dimethyl(cycloocta-1,5-diene)palladium,
methylbromo bis(triethylphosphine)palladium,
trans-phenylbromo bis(triethylphosphine)palladium,
dichloro bis(benzonitrile)palladium,
dichloro(vinylcyclohexene)palladium,
and the like.

Palladium compounds which are preferred as catalysts in the proceess of this invention bcause they are readily available, relatively inexpensive, and highly effective are compounds of the formulae:

$$Pd(A)_2X_2$$
$$Pd(B)X_2$$

and $$[Pd(A)X_2]_2$$

wherein A is a neutral monodentate ligand selected from the group consisting of benzonitrile, triethyl phosphine, carbon monoxide, dimethylsulfoxide, tetrahydrofuran, acetonitrile and the monoolefinic hydrocarbons of 2 to 8 carbon atoms such as ethylene, isobutylene, bicycloheptene, and the like; B is a neutral bidentate ligand selected from the group consisting of the diolefinic hydrocarbons of 4 to 10 carbon atoms such as 1,5-cyclooctadiene, endo-dicyclopentadiene, vinyl cyclohexene, and the like; and X is a halogen atom, preferably a chlorine atom.

Polymerization of the bicyclo[2.2.1]hept-2-enes by the process of this invention is suitably carried out by dissolving the palladium compound in the bicycloheptene monomer and stirring, with or without heating, preferably under a nitrogen atmosphere. Alternatively, the palladium compound can be dissolved in a suitable inert co-solvent, liquid at polymerization conditions, and then the solution can be combined with the bicycloheptene monomer to bring about polymerization. Suitable inert solvents are, among others, the saturated aliphatic compounds, for example, pentane, hexane, heptane, isooctane, purified kerosene, etc.; the cycloaliphatics such as cyclopentane, cyclohexane, methylcyclopentane, dimethylcyclopentane, etc.; the aromatic solvents such as benzene, toluene, xylene, etc.; the lower aliphatic carboxylic acids such as acetic acid, propionic acid, etc. and the esters thereof; alcohols; ethers and polyethers; and the N,N-dialkylamides.

Polymerization of the bicyclo[2.2.1]hept-2-enes with the catalysts of this invention proceeds exothermically, in general, and the polymerization reaction can be conducted over a broad temperature range, the optimum temperature depending on such factors as the nature of the bicycloheptene monomer polymerized, the particular catalyst employed, the concentration of the catalyst, and so forth. The polymerization reaction is suitably conducted under autogenous pressure at a temperature of from about −50° C. and lower to about 170° C. and higher, preferably from about 0° C. to about 150° C. Depending on the temperature and the molecular weight of the polymer desired, the time required for polymerization varies from about 0.01 to about 36 hours. The amount of palladium catalyst employed can vary from about 0.0001 to about 20 parts per 100 parts by weight of the bicycloheptene monomer, preferably from about 0.01 to about 5 parts per 100 parts.

The polynorbornenes obtained by the process of this invention can be produced in a range of molecular weights depending on temperature, catalyst concentration, etc. Polymers having molecular weights up to about 10,000 are high melting (greater than 150° C.) solids which are generally quite soluble in solvents similar in polarity to the monomer from which the particular polymer was obtained. Under other conditions polymers are obtained which, while identical in structure as shown by infrared analysis, are insoluble or only sparingly soluble because they have an appreciably higher average molecular weight.

As previously pointed out herein the novel polynorbornenes of this invention are of broad utility and certain of the many important applications of these polynorbornenes are hereinafter described in detail.

In a particular embodiment, the present invention is directed to cellular foams produced from certain of the novel polynorbornenes hereinbefore disclosed. More specifically, in this aspect the invention is directed to alkylene oxide addition products of poly(hydroxyalkylbicyclo[2.2.1]hept-2-enes) prepared by the process of this invention and to their application in the production of polyurethane foams having improved physical properties.

It is well known that polyurethane foams can be produced from polyisocyanates and polyethers such as the oxyalkylene derivatives of diols, triols and higher polyols. Furthermore, it is known to produce polyurethane foams with improved physical properties by the use of polyethers containing tertiary amino moieties such as triethanolamine, or containing phosphorous or halogen atoms, or containing aromatic or alicyclic groups, which impart characteristic properties to the foams. However, it has now been found that polyether polyols produced by the oxyalkylation of certain of the novel poly(hydroxyalkylbicyclo[2.2.1]hept - 2 - enes) hereinabove described can be reacted with polyisocyanates by techniques known in the art to produce flexible, semi-rigid, and rigid polyurethane foams with mechanical and dimensional properties, in particular elevated temperature strength, superior to the same properties of foams produced from conventional polyether polyols. The superior properties imparted to the foams produced from the novel polyether polyols of the present invention are in part attributable to the "rigid backbone" and high functionality of the said polyether polyols.

The polyether polyols employed to prepared polyurethane foams in accordance with this invention have the structural formula:

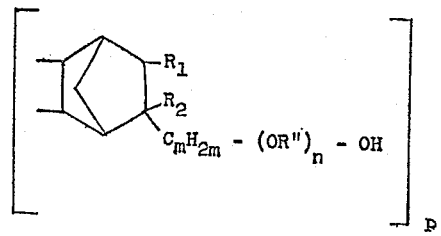

wherein $R_1$ and $R_2$ are selected from the group consisting of a hydrogen atom and a —$C_mH_{2m}(OR'')_n$—OH group, with the proviso that when $R_1$ is a $$—C_mH_{2m}—(OR'')_nOH$$

group then $R_2$ is a hydrogen atom, $m$ is an integer having a value of from 1 to 4, $R''$ is a substituted or unsubstituted alkylene group containing from 1 to 4 carbon atoms, $n$ is an integer having a value of from 1 to about 30, and $p$ is an integer having a value of from about 10 to about 30.

The compounds defined by the above structural formula can be obtained by reacting a poly(hydroxyalkylbicyclo[2.2.1]hept-2-ene) with an alkylene oxide or by reacting a hydroxyalkylbicyclo[2.2.1]hept-2-ene monomer with an alkylene oxide to form the corresponding hydroxyalkyleneoxyalkylbicyclo[2.2.1]hept - 2 - ene and then polymerizing said hydroxyalkyleneoxyalkylbicyclo[2.2.1]hept-2-ene. In either case the resulting products are polyether polyols which are structurally characterized by the presence of hydroxyl-terminated side chains of alkylene radicals, substituted or unsubstituted, which are connected to other alkylene radicals by means of recurring divalent oxy groups.

In the first of the above-described methods of preparing the bicycloheptene polyether polyols, the alkylene oxide, preferably a 1,2-alkylene oxide selected from the group consisting of ethylene oxide, 1,2-propylene oxide, 1,2-butylene oxide or mixtures thereof, is added to the poly(hydroxyalkylbicyclo[2.2.1]hept - 2 - ene) and reacted therewith in the presence of a small amount of catalyst. If desired, an inert solvent, e.g., toluene, xylene, diethylene glycol diethyl ether, or other suitable inert solvent, can be added to the reaction system. The reaction can be carried out under atmospheric or superatmospheric pressure at temperatures of about 60° C. to about 180° C., or higher. To the extent required, any conventional heat transfer means can be used to remove the exothermic heat of reaction. The products of the reaction are generally mixtures which can be utilized as such for their intended purposes or further refined to obtain a more purified product.

The amount of alkylene oxide that is reacted with the poly(hydroxyalkylbicyclo[2.2.1]hept - 2-ene) is determined by the application intended for the product. For the novel polyether polyols described herein which have particular utility as intermediates in the preparation of polyurethane foams, the average number of moles of alkylene oxide(s) to be reacted per mole of hydroxyl groups in the poly(hydroxyalkylbicyclo[2.2.1]hept-2-ene) is as follows: for rigid foams, up to about 3; for semi-rigid foams, from about 2 to about 10; for flexible foams, from about 5 to about 30. The exact amount of alkylene oxide to be used will also depend to some extent upon the particular isocyanate employed and upon the foam properties desired.

Illustrative of suitable substituted and unsubstituted alkylene oxides which can be employed for the purposes of the invention one can mention:

ethylene oxide,
propylene oxide,
1,2-butylene oxide,
cis-2,3-butylene oxide,
trans-2,3-butylene oxide,
3-chloro-1,2-epoxypropane,
1,2-epoxy-2-methylpropane, and the like.

The time required for completion of the alkylene oxide addition will vary. In general, a longer time of alkylene oxide addition is required for products with long hydroxypoly(alkyleneoxy) chains whereas with shorter hydroxypoly(alkyleneoxy) chains the reaction is faster and the addition time is relatively short. In general, under the reaction conditions hereinabove disclosed, the time required for alkylene oxide addition for products having 1 to about 30 oxyalkylene units per chain will range from a few hours to several days.

The alkylene oxide addition is carried out using known catalysts for this type of addition reaction, e.g. alkali and alkaline earth metal hydroxides or alkoxides such as sodium hydroxide, potassium hydroxide, calcium hydroxide, barium hydroxide, sodium methoxide, and the like, tertiaryaliphatic amines such as trimethylamine, and proton acids and Lewis acids. Strongly alkaline catalysts are preferred when products with long hydroxypoly(alkyleneoxy) chains are being prepared. The catalyst is employed in an amount of from about 0.02 weight percent to about 1.0 weight percent, or more, and preferably from about 0.05 to about 0.5 weight percent, based on the total weight of the reactants. An amount of active catalyst within this range is not so large as to cause difficulty in removal of catalyst or introduction of excess inorganics into the final product yet provides good results. All of the catalyst need not be added at the start of the reaction. If desired, a suitable amount can be initially added and the remainder of the catalyst added from time to time throughout the course of the reaction to maintain a substantially constant catalyst concentration.

The hydroxyl equivalent weights of the polyether polyols prepared herein can be determined readily by methods of analysis for hydroxyl content known in the art. In general, the hydroxyl numbers of the polyether polyols of this invention can range from about 10 to about 400, and more preferably, from about 30 to about 300. The hydroxyl number, which is a measure of and is inversely proportional to the hydroxyl equivalent weight, is defined as the number of milligrams of potassium hydroxide required for the complete neutralization of the hydrolysis product of the fully acetylated derivative prepared from one gram of polyol. The molecular weight of the polyether polyols can be readily calculated from the hydroxyl number by the formula:

Molecular weight=

$$\frac{56.1 \times 1000 \times f}{\text{Hydroxyl number}}$$

where $f$ represents the functionality, that is, the average number of hydroxyl groups per molecule of polyol. Conventional polyether polyols which are used in the production of semi-rigid or rigid polyurethane foams generally vary from about three to about eight in average functionality whereas the polyether polyols of this invention vary in functionality from about 10 to about 30. The high functionality of the polyether polyols of this invention can result in the formation of a rigid polyurethane foam with a very high degree of cross-linking, and consequently enhanced physical properties, when the polyol and polyisocyanate used have relatively low equivalent weights.

The poly(hydroxyalkylbicyclo[2.2.1]hept-2-enes) employed in the production of the polyether polyols of the invention are prepared in the manner hereinbefore disclosed, and using the palladium catalysts hereinbefore described, from hydroxyalkylbicyclo[2.2.1]hept-2-ene monomers selected from the group consisting of the 5-hydroxyalkylbicyclo[2.2.1]hept-2-enes, the 5,5-bis(hydroxyalkyl)bicyclo[2.2.1]hept-2-enes, and the 5,6-bis(hydroxyalkyl)bicyclo[2.2.1]hept-2-enes, wherein each hydroxyalkyl group contains from 1 to 4 carbon atoms. Illustrative of the suitable hydroxyalkylbicyclo[2.2.1]hept-2-ene monomers one can mention:

5-(hydroxymethyl)bicyclo[2.2.1]hept-2-ene,
5-(2-hydroxyethyl)bicyclo[2.2.1]hept-2-ene,
5-(3-hydroxypropyl)bicyclo[2.2.1]hept-2-ene,
5-(2-hydroxypropyl)bicyclo[2.2.1]hept-2-ene,
5-(1-hydroxy-2-propyl)bicyclo[2.2.1]hept-2-ene,
5-(4-hydroxybutyl)bicyclo[2.2.1]hept-2-ene,
5-(1-hydroxy-3-butyl)bicyclo[2.2.1]hept-2-ene,
5-(2-hydroxy-1,1-dimethylethyl)bicyclo[2.2.1]hept-2-ene, 5,6-bis(hydroxymethyl)bicyclo[2.2.1]hept-2-ene,
5,6-bis(3-hydroxypropyl)bicyclo[2.2.1]hept-2-ene,
5-hydroxymethyl-6-(2-hydroxyethyl)bicyclo[2.2.1]hept-2-ene,
5-hydroxymethyl-6-(4-hydroxybutyl)bicyclo[2.2.1]hept-2-ene,
5,5-bis(hydroxymethyl)bicyclo[2.2.1]hept-2-ene,
and the like.

As hereinbefore disclosed, the polyether polyols of this invention can be produced by first preparing the poly-(hydroxyalkylbicyclo[2.2.1]hept-2-ene) and then reacting the polymer with the alkylene oxide or by reacting the hydroxylalkylbicyclo[2.2.1] - hept - 2 - ene monomer with the alkylene oxide to form the corresponding hydroxyalkyleneoxyalkylbicyclo[2.2.1]hept-2-ene, which is then polymerized using the palladium catalyst.

In the prepartion of polyurethane foams by the reaction of organic polyisocyanates with the polyether polyols of this invention, the foaming operation can be carried out continuously or batchwise employing the one-shot, semi-prepolymer or prepolymer techniques, all of which are well known to the art. In general, the total isocyanato equivalent to total active hydrogen equivalent including water should be such as to provide a ratio of 0.8 to 1.2 equivalents of isocyanato group per equivalent of active hydrogen, and preferably a ratio of about 1.0 to 1.1 equivalents.

The organic polyisocyanates which can be employed to prepare the polyurethane foams of this invention include, for example, 2,4- and 2,6-tolylene diisocyanate, m- and p-phenylene diisocyanate, durylene diisocyanate, bis(4-isocyanatophenyl)methane, 4,4', 4" - tris(isocyanatophenyl)methane, hexamethylene diisocyanate, xylylene diisocyanates, 3,10 - diisocyanatotricyclo[$5.2.1.0^{2,6}$] - decane, and polyisocyanates listed in the publication of Siefken, Annalen 562, pages 122–135 (1949). Further polyisocyanates of particular interest are those obtained by reaction of aromatic amines with formaldehyde and phosgenation of the resulting condensation products as set forth in United States Patents Nos. 2,683,730 and 3,012,008. The preferred organic polyisocyanates are the tolylene diisocyanates.

Foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-hydroxyl reaction, or by a combination of these two methods. All of these methods are known in the art. The preferred blowing agents are certain halogen-substituted aliphatic hydrocarbons which have boiling points between about —40° C. and 70° C., and which vaporize at or below the temperature of the foaming reaction. These blowing agents include, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1-difluoro-1,2,2-trichloroethane, chloropentafluoroethane, 1,1,1-trifluoro-2-chloroethane, 1-chloro-1-fluoroethane, 1-chloro-2-fluoroethane, 1,1,1-trichloro-2,2,2-trifluoroethane, 1,1,2-trichloro - 1,2,2 - trifluoroethane, 2 - chloro - 1,1,1,2,3,3,4,4,4-nonafluorobutane, hexafluorocyclobutene and octafluorocyclobutane. Other useful blowing agents include low-boiling hydrocarbons such as butane, pentane, hexane, cyclohexane, and the like. Many other compounds easily volatilized by the exotherm of the isocyanate-hydroxyl reaction also can be employed. A further class of blowing agents includes thermally-unstable compounds which liberate gasses upon heating, such as N,N'- dimethyl-N,N'-dinitrosoterephthalamide.

The amount of blowing agent used will vary with the density desired in the foamed product. In general, it may be stated that for 100 grams of reaction mixture containing an average NCO/OH ratio of about 1:1, about 0.005 mole of gas are used to provide densities ranging from 30 pounds to 1 pound per cubic foot, respectively.

Catalysts can be employed in the reaction mixture for accelerating the isocyanate-hydroxyl reaction. Such catalysts, which are well known in the art, include a wide variety of compounds such as, for example: (a) tertiary amines such as trimethylamine, N-methylmorpholine, N-ethylmorpholine, N,N - dimethylbenzylamine, N,N - dimethylethanolamine, N,N,N',N'-tetramethyl-1,3-butanediamine, triethanolamine, 1,4 - diazabicyclo[2.2.2]octane, and the like; (b) tertiary phosphines such as trialkylphosphines, dialkylbenzylphosphines, and the like; (c) strong bases such as alkali and alkaline earth metal hydroxides, alkoxides and phenoxides; (d) acidic metal salts of strong acids such as ferric chloride, stannic chloride, stannous chloride, antimony trichloride, bismuth nitrate, bismuth chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bisacetylacetonealkylenediimines, salicylaldehydeimine, and the like, with various metals such as Be, Mg, Zn, Cd, Pb, Ti, Zr, Sn, Sb, As, Bi, Cr, Mo, Mn, Fe, Co, Ni, or such ions as $MoO_2^{++}$, $UO_2^{++}$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2-(N,N-dialkylamino)-alkanols, such as the well known chelates of titanium obtained by said or equivalent procedures; (g) salts of organic acids with a variety of metals such as alkali metals, alkaline earth metals, Al, Sn, Pb, Sb, Mn, Co, Ni and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb, and Bi, and metal carbonyls of iron and cobalt. Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-dimethylaminobenzoate), dibutyltin-bis(6-methylaminocaproate), and the like. Similarly, there can be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-diethylaminopentylate), dibutyltin dichloride, dioctyltin dichloride, and the like.

The tertiary amines can be used as primary catalysts for accelerating the reactive hydrogen-isocyanate reaction or as secondary catalysts in combination with the above-noted metal catalysts. Metal catalysts, or combinations of metal catalysts can also be employed as the accelerating agents, without the use of amines. The catalysts are employed in small amounts, for example, from about 0.001 percent to about 5 percent, based on the weight of the reaction mixture.

It is also within the scope of the invention to employ small amounts, e.g. about 0.001 percent to 5.0 percent by weight, based on the total reaction mixture, of an emulsifying agent such as a siloxane-oxyalkylene block copolymer having from about 10 to 80 percent by weight of siloxane polymer and from 90 to 20 percent by weight of alkylene oxide polymer, such as the block copolymers described in United States Patents Nos. 2,834,748 and 2,917,480. Another useful class of emulifiers are the "nonhydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. The copolymers generally contain from 5 to 95 weight percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Although the use of an emulsifier is desirable to influence the type of foam structure that is formed, the foam products of the invention can be prepared without emulsifiers.

It is also within the scope of the present invention to blend varying amounts of polyfunctional compounds with the novel polyether polyols hereinbefore disclosed before reaction with the polyisocyanates. Such compounds include, among others, alkylene glycols such as ethylene glycol, diethylene glycol, triethylene glycol, tetraethylene glycol and the corresponding propylene homologs such as propylene glycol, dipropylene glycol, and the like; saturated aliphatic polyols such as glycerol, 1,2,4-butanetriol, 1,2,6-hexanetriol, trimethylolpropane, sorbitol, pentaerythritol, and the like; and acyclic amines such as triethanolamine, triisopropanolamine, and the like. Also included are the ethylene, propylene and butylene oxide addition products of the above-noted aliphatic polyols and amines which have hydroxyl numbers in the range of about 300 to 750, and the alkylene oxide adducts of acyclic polyamines such as ethylenediamine, diethylenetriamine, triethylenetetramine, and the like. When admixed with the polyether polyols, the above-described polyfunctional compounds provide the advantage of further diversifying the combinations of characteristics obtainable in the ultimate foam product by increasing the number of available crosslinking sites.

In a second particular embodiment, the present invention is directed to lubricating oil compositions containing, as pour point depressants, certain of the novel polynorbornenes hereinbefore disclosed. More specifically, in this aspect the invention is directed to polynorbornenes having pendant side chains derived from long chain fatty acids and to their use as pour point depressants in petroleum-derived lubricating oils.

The pour point of an oil is the temperature at which crystallization of wax has proceeded to such an extent that a further lowering of temperature would cause flow to cease. The pour point may be lowered by removing part of the waxes from the oil, by adding a low viscosity component, or by adding a resin which alters the crystalline habit of the waxes leading to flow at lower temperatures. Heretofore, numerous compounds have been proposed as pour point depressants for lubricating oils. Among the pour point depressants in common use are alkyl naphthalenes and other long-chain alkylated ring systems, polymers of long chain alkyl acrylates, and multivalent metal soaps of various fatty acids.

It has now been discovered that polynorbornenes of the structure hereinbefore disclosed which have pendant, fatty-acid-derived, side chains attached to the bicycloheptanylene radical are superior pour point depressants for petroleum-derived lubricating oils. These polymers have unusually high thermal and oxidative stability and a "rigid" chain structure, in consequence of which they are highly effective as pour point depressants in lubricating oil compositions prepared from diverse petroleum-derived base oils and with widely differing end uses in the lubricant art. They are also resistant to degradation under severe environmental conditions during use and thereby minimize coking problems. Furthermore, the novel pour point depressants of this invention are fully miscible with many common oil additives such as the conventional oil detergents and viscosity index improvers.

The polymers employed as pour point depressants in accordance with this invention are selected from those having the structural formulae:

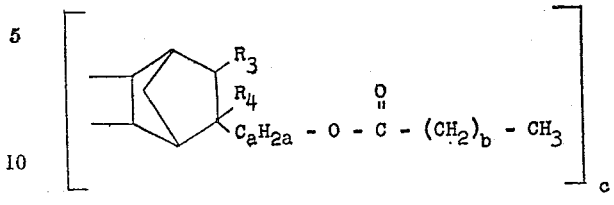

and

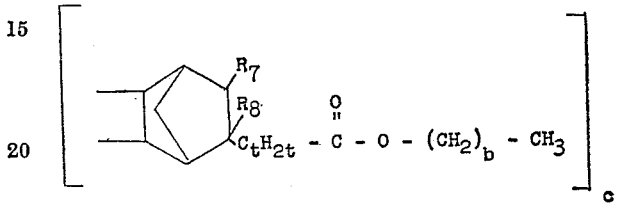

wherein $R_3$ and $R_4$ are selected from the group consisting of a hydrogen atom and

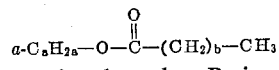

group with the proviso that when $R_3$ is

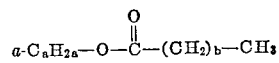

group then $R_4$ is a hydrogen atom, $R_7$ and $R_8$ are selected from the group consisting of a hydrogen atom and

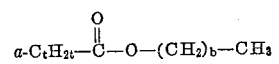

group with the proviso that when

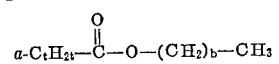

group then $R_8$ is a hydrogen atom, $a$ is an integer having a value of from 0 to 4, $b$ is an integer having a value of from 4 to 20, $t$ is an integer having a value of from 0 to 3, and $c$ is an integer having a value of from about 10 to about 30.

As shown by the above structural formulae the novel polynorbornenes of utility as pour point depressants have side chains attached to the bicycloheptanylene radical in the polymer chain each of which can contain from 6 to 26 carbon atoms. Each of the side chains can be of the same length, but it is preferred for maximum effectiveness of the polymer as a pour point depressant, that the side chains be of different lengths and that the average side chain length be from about 12 to about 18 carbon atoms. The polymers which are particularly preferred are those represented by the above structural formulae wherein $b$ has an average value of about 13.

The pour point depressants of this invention can be prepared by any of several alternate procedures. Thus, the suitable poly(hydroxyalkylbicyclo[2.2.1]hept-2-enes) can be esterified with saturated fatty acids, either directly or by means of ester interchange with esters of the saturated fatty acids. Alternately, the suitable poly(bicyclo[2.2.1]hept-2-ene carboxylic acids) can be esterified with saturated fatty alcohols, either directly or by means of ester interchange with esters of the saturated fatty alcohols. Still another procedure is to prepare the pour point depressants by polymerization of monomeric fatty acid esters of hydroxyalkylbicyclo[2.2.1]hept-2-enes or of monomeric fatty alcohol esters of bicyclo[2.2.1]hept-2-ene carboxylic acids.

The starting materials for preparing the pour point depressants of the invention are monomers selected from the group consisting of 5-hydroxybicyclo[2.2.1]hept-2-ene, 5,6-dihydroxybicyclo[2.2.1]hept-2-ene, the 5-hydroxyalkylbicyclo[2.2.1]hept-2-enes wherein the hydroxyalkyl group contains from 1 to 4 carbon atoms, the 5,5-bis(hydroxyalkyl)bicyclo[2.2.1]hept-2-enes wherein each hydroxyalkyl group contains from 1 to 4 carbon atoms, the 5,6 - bis(hydroxyalkyl)bicyclo[2.2.1]hept - 2 - enes wherein each hydroxyalkyl group contains from 1 to 4 carbon atoms, bicyclo]2.2.1]hept-2-ene-5-carboxylic acid, bicyclo[2.2.1]hept - 2 - ene - 5,6 - dicarboxylic acid, the 5-(alkylcarboxylic acid)bicyclo[2.2.1]hept-2-enes wherein the alkyl group contains 1 to 3 carbon atoms, the 5,5-bis(alkylcarboxylic acid)bicyclo[2.2.1]hept - 2 - enes wherein each alkyl group contains 1 to 3 carbon atoms, and the 5,6-bis(alkylcarboxylic acid)bicyclo[2.2.1]hept-2-enes wherein each alkyl group contains 1 to 3 carbon atoms.

Illustrative of specific compounds from among the above described group one can mention:

5-(hydroxymethyl)bicyclo[2.2.1]hept-2-ene,
5-(2-hydroxyethyl)bicyclo[2.2.1]hept-2-ene,
5-(3-hydroxypropyl)bicyclo[2.2.1]hept-2-ene,
5-(2-hydroxypropyl)bicyclo[2.2.1]hept-2-ene,
5-(1-hydroxy-2-propyl)bicyclo[2.2.1]hept-2-ene,
5-(4-hydroxybutyl)bicyclo[2.2.1]hept-2-ene,
5-(1-hydroxy-3-butyl)bicyclo[2.2.1]hept-2-ene,
5-(2-hydroxy-1,1-dimethylethyl)bicyclo[2.2.1]hept-2-ene,
5,6-bis(hyroxymethyl)bicyclo[2.2.1]hept-2-ene,
5,6-bis(3-hydroxypropyl)bicyclo[2.2.1]hept-2-ene,
5-hydroxymethyl-6-(2-hydroxyethyl)bicyclo-[2.2.1]hept-2-ene,
5-hydroxymethyl-6-(2-hydroxyethyl)bicyclo-[2.2.1]hept-2-ene,
5-hydroxymethyl-6-(4-hydroxybutyl)bicyclo-[2.2.1]hept-2-ene,
5,5-bis(hydroxymethyl)bicyclo[2.2.1]hept-2-ene,
bicyclo[2.2.1]hept-2-ene-5-carboxylic acid,
bicyclo[2.2.1]hept-2-ene-5,6-trans-dicarboxylic acid,
5-(methylcarboxylic acid)bicyclo[2.2.1]hept-2-ene,
5-(ethyl-2-carboxylic acid)bicyclo[2.2.1]hept-2-ene,
5-(propyl-3-carboxylic acid)bicyclo[2.2.1]hept-2-ene,
5-(propyl-2-carboxylic acid)bicyclo[2.2.1]hept-2-ene,
5,6 - bis(methylcarboxylic acid)bicyclo[2.2.1]hept-2-ene,
5-(methylcarboxylic acid)bicyclo[2.2.1]hept-2-ene-6-carboxylic acid,
5-(methylcarboxylic acid)bicyclo[2.2.1]hept-2-ene-5-carboxylic acid, and the like.

In preparing the pour point depressants, the poly-(hydoxyalkylbicyclo[2.2.1]hept-2-enes) can be esterified directly with a saturated fatty acid or, more suitably, a mixture of saturated fatty acids which will provide the desired average side chain length, or by ester interchange with a saturated fatty acid ester or, preferably, mixtures thereof. Similarly, the poly(hydroxyalkylbicyclo[2.2.1] hept-2-ene carboxylic acids) can be esterified directly with a saturated fatty alcohol or, more suitably, a mixture of saturated fatty alcohols which will provide the desired average side chain length, or by ester interchange with a saturated fatty alcohol ester or, preferably, mixtures thereof. The suitable saturated fatty acids are the normal alkanoic acids containing from 6 to 22 carbon atoms, e.g. caproic acid, heptoic acid, caprylic acid, pelargonic acid, undecylic acid, lauric acid, tridecylic acid, myristic acid, pentadecyclic acid, palmitic acid, margaric acid, stearic acid, nondecylic acid, arachidic acid, n-heneicosoic acid, and behenic acid, or mixtures of two or more of these fatty acids, as for example caproic/stearic, caprylic/arachidic, pelargonic/palmitic, lauric/myristic, lauric/myristic/palmitic, myristic/palmitic/stearic, and the like. Synthetic fatty acids or acids isolated from natural sources, as for example coconut acids, tall oil acids, or tallow acids, can be used. The mixtures of fatty acids can be artificial mixtures of relatively pure individual fatty acids, such as a mixture of myristic acid, lauric acid and stearic acid, or a naturally occurring mixture of fatty acids such as the coconut fatty acids or certain fractions thereof. Such a natural mixture can, in addition, be modified by the inclusion of one or more fatty acids from another source. Furthermore, small amounts, for example up to about 10 percent, of branched chain acids or partially unsaturated acids, which are commonly present in both natural and synthetic straight chain, saturated, fatty acids, are not detrimental to the pour point depressants of this invention.

The suitable saturated fatty alcohols are the normal 1-hydroxyalkanes containing from 6 to 22 carbon atoms, e.g. n-hexanol, n-heptanol, n-octanol, n-nonanol, n-decanol, n-undecanol, n-dodecanol, n-tridecanol, n-tetradecanol, n-pentadecanol, n-hexadecanol, n-heptadecanol, n-octadecanol, n-nonadecanol, n-eicosanol, n-heneicosanol and n-docosanol. Mixtures of two or more of these alcohols may be used. Synthetic fatty alcohols or fatty alcohols derived from natural sources, as for example by reduction of the coconut acids, the tall oil acids or tallow acids can be used. The mixtures of fatty alcohols can be artificial mixtures of relatively pure individual fatty alcohols, such as a mixture of n-dodecanol, n-tetradecanol, and n-hexadecanol, or mixtures obtained by reducing a naturally occurring mixture of fatty acids such as the coconut fatty acids or certain fractions thereof. Such a natural mixture can, in addition, be modified by the inclusion of one or more fatty alcohols from another source. Furthermore, small amounts, for example up to about 10 percent, of branched chain alcohols or partially unsaturated alcohols which are commonly present in both natural and synthetic staright chain, saturated, fatty alcohols, are not detrimental to the pour point depressants of this invention.

The direct esterification and ester interchange reactions are generally conducted with the aid of a catalyst. The catalyst can be an acid catalyst, either a protonic acid or a Lewis acid, or an alkaline catalyst such as the hydroxides and lower alkoxides of alkali metals e.g. sodium hydroxide, sodium methoxide, sodium butoxide, potassium ethoxide, potassium propoxide, and the like. The catalyst is preferably employed in the amount of about 1 percent or less, based on the weight of the polymer. The polymer should be essentially completely esterified but a small percentage of the hydroxyl or carboxyl groups contained therein, as the case may be, for example up to about 10 percent, can be left unesterified without detrimentally affecting the pour point depressant properties.

Where ester interchange is employed to prepare the pour point depressants the methyl ester of the hereinbefore described fatty acids can be reacted with the poly(hydroxyalkylbicyclo[2.2.1]hept-2-ene) or the fatty alcohol acetate can be reacted with the poly(bicyclo[2.2.1]hept-2-ene carboxylic acid).

The direct esterification or ester interchange reactions can be carried out at temperatures up to about 300° C. and require reaction periods of up to several hours. A preferred method for esterification of the poly(hydroxyalkylbicyclo[2.2.1]hept-2-enes) is direct thermal reaction with a saturated fatty acid at 150 to 300° C., preferably 200 to 250° C. with the water formed in the reaction being distilled from the system.

The pour point depressants of the present invention can be added to lubricating oils in an amount from about 0.02 to about 2.0 percent, based on the weight of the lubricating oil, more suitably in an amount of from about 0.05 to about 1.0 percent, and preferably in an amount of from about 0.1 to about 0.4 percent. The base fluid employed in preparing the lubricating oil compositions of this invention can be any one of a wide variety of petroleum-derived oils of lubricating viscosity or mixtures thereof, for example, Pennsylvania or paraffin-base oils, Mid-Continent or mixed-base oils, Coastal or naphthenic-base oils, and so forth. In addition to the hereinbefore described pour point depressants the lubricating oil compositions can contain minor amounts of conventional lubricant additives, for example, additives serving as viscosity index improvers, anti-oxidants, anti-foaming agents, extreme pressure agents, anti-wear agents, corrosion inhibitors, and so forth. The pour point depressants of this invention are particularly useful in formulating the common S.A.E. multigrade crankcase oils, for example, S.A.E. grades 5W–20, 5W–30, 10W–30, and 20W–40.

In a third particular embodiment, the present invention is directed to alkyd coatings resins produced from certain of the novel polynorbornenes hereinbefore disclosed. More specifically, in this aspect the invention is directed to improved alkyd coatings resins produced by the reaction of unsaturated fatty acids or fatty oils, or mixtures of unsaturated fatty acids or fatty oils and polycarboxylic acids or the anhydrides thereof, with hydroxyl-substituted polynorbornenes.

Alkyd resins, the most common of which are the oil-modified glyceryl phthalate alkyds, are by far the most widely used class of coatings resins, representing at present about forty percent of the entire coatings resin market. Among the many applications of the alkyds as coatings resins, one can mention their use in flat wall paints, enamels, exterior trim paints, automotive top-coats and primers, and so forth. The alkyds have been particularly successful as coatings resins because of their many desirable characteristics including low cost, excellent exterior durability, and color retention. However, the conventional alkyd resins have relatively poor chemical resistance, in particular, poor alkali resistance, and this has limited their application and in some instances resulted in their being supplanted by other materials such as the epoxy ester or urethane resins.

It has now been discovered that improved alkyd resins can be produced from polynorbornene polyols, i.e. hydroxyl - substituted poly(bicyclo[2.2.1]hept-2-enes), having the structural formula:

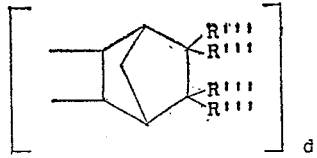

wherein each R''' is independently selected from the group consisting of a hydrogen atom, a —($C_yH_{2y}$)OH radical and a —($C_zH_{2z-1}$)(OH)$_2$ radical, with the proviso that the total number of hydroxyl groups per bicycloheptanylene radical is at least one and less than four and there is not more than one hydroxyl group directly attached to a carbon atom of the bicycloheptanylene radical, $y$ is an integer having a value of from 0 to about 10, $z$ is an integer having a value of from 2 to about 10, and $d$ is an integer having a value such that the molecular weight of the polyol is at least about 500, or higher, and more preferably having a value of from about 10 to about 30. Thus, each structural unit of the polymer chain of the formula:

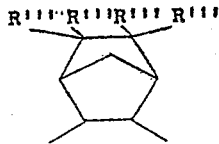

can contain one to three hydroxyl groups.

The above described polyols are produced by polymerization of bicyclo[2.2.1]hept-2-ene monomers substituted at the 5 and/or 6 positions by from one to three of the radicals defined above using the palladium catalysts hereinbefore disclosed. Illustrative of the substituted bicyclo[2.2.1]hept-2-ene monomers that can be employed to produce the polyols one can mention:

5-hydroxybicyclo[2.2.1]hept-2-ene,
5,6-bis(hydroxy)bicyclo[2.2.1]hept-2-ene,
5-hydroxymethylbicyclo[2.2.1]hept-2-ene,
5,5-bis(hydroxymethyl)bicyclo[2.2.1]hept-2-ene,
5,6-bis(hydroxymethyl)bicyclo[2.2.1]hept-2-ene,
5,5,6-tris(hydroxymethyl)bicyclo[2.2.1]hept-2-ene,
5-(2-hydroxyethyl)bicyclo[2.2.1]hept-2-ene,
5 - hydroxymethyl-6-(2-hydroxyethyl)bicyclo[2.2.1]hept-2-ene,
5-(4-hydroxybutyl)bicyclo[2.2.1]hept-2-ene,
5-(7-hydroxyheptyl)bicyclo[2.2.1]hept-2-ene,
5 - hydroxymethyl - 6-(10-hydroxydecyl)bicyclo[2.2.1]hept-2-ene,
5-(1-hydroxy-2-propyl)bicyclo[2.2.1]hept-2-ene,
5-(1-hydroxy-3-butyl)bicyclo[2.2.1]hept-2-ene,
5 - (2 - hydroxy-1,1-dimethylethyl)bicyclo[2,2,1]hept-2-ene,
5-(1,2-dihydroxyethyl)bicyclo[2.2.1]hept-2-ene,
5-(1,4-dihydroxybutyl)bicyclo[2.2.1]hept-2-ene,
5,6-bis(1,3-dihydroxypropyl)bicyclo[2.2.1]hept-2-ene,
5-(2,4-dihydroxypentyl)bicyclo[2.2.1]hept-2-ene, and the like.

The substituted bicyclo[2.2.1]hept-2-ene monomers listed above can be readily prepared by known procedures. Thus, the substituted bicyclo[2.2.1]hept-2-enes can be prepared by Diels-Alder type reactions of cyclopentadiene with suitable dienophiles. For example, 5-hydroxymethyl-bicyclo[2.2.1]hept-2-ene can be prepared by reaction of cyclopentadiene with allyl alcohol, 5-(2-hydroxy-1,1-dimethylethyl)bicyclo[2.2.1]hept-2-ene can be prepared by reaction of cyclopentadiene with 2,2-dimethyl-3-butenol, and 5-(1,2-dihydroxyethyl)bicyclo[2.2.1]hept-2-ene can be prepared by reaction of cyclopentadiene with vinyl ethylene glycol.

The alkyd resins of this invention are produced by esterification of the above-described polyols. The esterification can be accomplished by reacting the polyol with a monobasic reactant selected from the group consisting of unsaturated fatty acids of from about 10 to about 25 carbon atoms and fatty oils having a relatively high degree of unsaturation, that is, fatty oils with an iodine value of at least about 100. It is preferred, however, to produce the alkyd resins by reacting the polyol with a mixture of the above-described monobasic reactant and a polybasic reactant selected from the group consisting of polycarboxylic acids containing from 4 to 54 carbon atoms and the anhydrides of said polycarboxylic acids. Use of the mixture of monobasic and polybasic reactants to esterify the polyol permits greater variation in the molecular weight and properties of the resulting alkyd resin. The term esterification is employed in this instance in a broad sense to mean the reaction of the polyol and the monobasic or polybasic acid or the polybasic anhydride, or the alcoholysis reaction of the polyol and the esters of the fatty oil.

The monobasic reactant can be an unsaturated fatty acid, that is, an unsaturated, unsubstituted, aliphatic, monocarboxylic acid of from about 10 to about 25 carbon atoms. Mono-, di- or poly-ethenoid fatty acids, or mixtures thereof, can be employed. Illustrative of the suitable unsaturated fatty acids for the purposes of this invention one can mention caproleic acid, lauroleic acid, palmitoleic acid, oleic acid, linoleic acid, lonolenic acid, eleostearic acid, arachidonic acid, and the like.

Alternatively, the monobasic reactant can be a fatty oil having a relatively high degree of unsaturation, or a mixture of two or more of the said fatty oils, or a mixture of the said fatty oils and the above-described unsaturated fatty acids. The average degree of unsaturation of a fatty oil is commonly indicated by the iodine value, which is defined as the number of grams of iodine or equivalent halogen absorbed by 100 grams of the oil. The fatty oils that are of utility for the purposes of this invention are those having an iodine value as measured by the Wijs method [Analyst, 54, 12 (1929)] of at least about 100. Illustrative of the suitable fatty oils one can mention soybean oil, linseed oil, tung oil, tall oil, menhaden oil, cod-liver oil, herring oil, cottonseed oil, peanut oil, rapeseed oil, corn oil, dehydrated castor oil, safflower oil, and the like. Fatty acids derived from these fatty oils can, of course, also be employed.

As hereinbefore disclosed, the polyol can be esterified with the above-described monobasic reactants to form an alkyd resin, but is preferably esterified by reaction with a mixture of the above-described monobasic reactant and a polybasic reactant. The suitable polybasic reactants are compounds selected from the group consisting of polycarboxylic acids containing from 4 to 54 carbon atoms and the anhydrides thereof. The polycarboxylic acids can be saturated aliphatic acids, unsaturated aliphatic acids, alicyclic acids or aromatic acids which contain at least two carboxyl groups. The polybasic reactants that are of utility for the purposes of this invention include, among others, maleic acid, fumaric acid, dioleic acid, trioleic acid, sebacic acid, adipic acid, azelaic acid, phthalic acid, tetrahydrophthalic acid, hexahydrophthalic acid, maleic anhydride, adipic anhydride, phthalic anhydride, tetrahydrophthalic anhydride, hexahydrophthalic anhydride, and the like.

The novel alkyd resins of this invention can be prepared from the hereinabove described polyols and the monobasic reactant, or mixture of monobasic and polybasic reactants, by conventional alkyd resin production techniques which are well known to the art. Thus, for example, where a mixture of monobasic and polybasic reactants is employed, the monobasic reactant can be dissolved in the polybasic reactant and the solution reacted with the polyol at elevated temperatures, with or without the aid of a catalyst. In a preferred procedure, all components of the alkyd resin are charged to a reaction vessel, along with the catalyst, if one is employed, and a high boiling organic solvent, the admixture is heated at a temperature of about 150° C. to about 350° C., preferably at about 200° C. to about 250° C., for a period of about 3 to about 16 hours, during which time the water of esterification is removed. Suitable catalysts for the esterification reaction, all of which are well known to the art, include, among others, triphenylphosphite and soluble salts of certain organic acids such as the naphthenates of calcium, lithium, sodium and the like. Illustrative of the high boiling organic solvents that can be employed are xylene, toluene, ethylbenzene, and the like.

As will be apparent to those with ordinary skill in this art, the particular monobasic and polybasic reactants that are employed to prepare the alkyd resin depends upon the particular characteristics desired, for example, hardness, resistance to certain chemicals, and so forth, and upon the rate of drying wanted, as well as whether an air-dried or baked finish is desired, that is, whether the resin is to be cured by slow oxidation and polymerization on exposure to air at room temperature or by baking. Thus, for example, the use of polyethenoid fatty acids results in an alkyd resin that dries readily without application of heat, while the use of maleic acid as the polybasic reactant results in an alkyd resin of increased hardness.

The extent of esterification of the alkyd resin, that is, the ratio of the esterified hydroxyl groups to original hydroxyl groups in the polyol, is dependent upon the intended application of the coating formulation prepared from the alkyd resin and upon the compatibility of modifying components included in the coating formulation along with the alkyd resin. Thus, for example, the extent of esterification should be from about 10 to about 65 percent where the alkyd resin is to be employed in conjunction with aminoplasts, thermoset acrylics, urethane resins or epoxy resins in chemically resistant coatings for appliances, furniture, automobiles, etc., from about 30 to about 85 percent where the alkyd resin is to be employed as a pigment dispersant for vinyl resin compositions or as a plasticizer for nitrocelulose resins, from about 50 to about 80 percent where the alkyd resin is to be employed as a medium oil length vehicle for bake metal primers, maintenance paints, floor varnishes, etc., and from about 70 to about 100 percent where the alkyd resin is to be employed as a long oil length vehicle for bake metal finishes, house paints, general purpose enamels, etc.

The preferred alkyd resins of this invention are produced by reacting the hereinbefore described polyols with a mixture of the hereinbefore described monobasic and polybasic reactants. It will be recognized by those skilled in the art that the proportions of the polyol, monobasic reactant, and polybasic reactant that can be employed are limited by the relationships developed by Carothers (see, for example, Principles of Polymer Chemistry, P. J. Flory, Cornell University Press, 1953, p. 354). As is made evident by these relationships the optimum ratio of polyol, monobasic reactant, and polybasic reactant is determined by the functionality of the polyol and of the polybasic reactant and by the intended application for the alkyd resin as a determinant of the extent of esterification.

As hereinbefore disclosed, both air-dried and baked coating compositions can be produced with the alkyd resins of this invention. The novel alkyd resins described herein can be employed alone or in admixture with other resins, and, of course, with pigments, to produce coating compositions having numerous desirable characteristics. Coating compositions are prepared from the novel alkyd resins of this invention by conventional procedures utilized in the alkyd resins art. Thus, the alkyd resins are typically diluted with solvents such as xylene, petroleum naphtha, mineral spirits, and the like, to a total solids concentration of about 40 to about 70 percent and minor amounts of conventional driers, such as the water-insoluble metallic soaps of lead, cobalt, manganese and zirconium, are commonly added.

The novel alkyd resins disclosed herein can be employed wherever conventional alkyd resins find application and are of particular utility in applications involving exposure to aqueous alkaline media because of their markedly improved resistance to boiling water and alkali as compared with conventional alkyds. The alkyd resins of this invention also possess other important advantages over the alkyd resins hereinbefore known to the art. Thus, the "backbone" of the polyols employed in preparing the alkyd resins is composed entirely of carbon and hydrogen and contains no ether or ester groups, so that films prepared from the alkyd resins retain their strength over a longer period of time because any oxidative or hydrolytic cleavage occurs in the side chains. The high functionality of the polyols employed herein, as compared to conventional polyols used in alkyd resin preparation, permits the use of relatively larger quantities of low cost fatty acids in the formulation. Furthermore, the "rigid-ring backbone" of the polyols allows the incorporation of larger quantities of the fatty acids without sacrifice of film hardness as compared with conventional alkyd resins.

Examples illustrative of the present invention but not intended to limit the invention in any manner follow. Examples 1 to 30 inclusive are illustrative of the preparation of the novel polynorbornenes by the process of this invention. In all instances, infrared analysis of the polynorbornene was carried out and was consistent with the structure of a polymer composed of repeating structural units being joined directly to one another at the 2-position and 3-position carbon atoms of the bicycloheptanylene radical. Examples 31 and 32 are illustrative of the preparation of polyurethane foams from the novel polynorbornenes of the invention; while Examples 33 to 47 inclusive are illustrative of the preparation of pour point depressants and Examples 48 to 51 inclusive are illustrative of the preparation of alkyd coatings resins.

EXAMPLE 1

*Polymerization of bicyclo[2.2.1]hept-2-ene*

To a 200 ml. glass flask there were charged 500 mg. of dichloro bis(benzonitrile) palladium and 75 g. of bicyclo[2.2.1]hept-2-ene and the resulting yellow-orange solution was heated with stirring under a nitrogen atmosphere. The temperature remained constant near the boiling point for 0.5 hour and then began to increase slowly, reaching 123° C. after about 14 hrs., at which point the reaction mixture was viscous and black. After cooling, the reaction mixture was diluted with 200 ml. of benzene and then 10 g. of charcoal was added and the flask was heated. The mixture was then filtered through a diatomaceous earth filter into vigorously stirred acetone and the white precipitate which formed was filtered off and dried for 12 hours at 65° C. and 1 mm. of Hg to give a weight of 19.5 g. After two further reprecipitations from benzeneacetone the yield was 10 g. of poly(bicyclo[2.2.1]hept-2-ene) having a melting point of 266–267° C. Infrared analysis of the product was consistent with a polymer chain of repeating bicycloheptanylene units joined directly to one another at the 2-position and 3-position carbon atoms.

*Analysis.*—Calcd. for $(C_7H_{10})_x$: C, 89.3; H, 10.7. Found: C, 88.59; H, 10.70. Mol. weight (ebullioscopic in benzene): 9000.

EXAMPLE 2

*Polymerization of 5,5-dimethylbicyclo[2.2.1]hept-2-ene*

A nitrogen filled, capped, glass tube was charged with 10 g. of 5,5-dimethylbicyclo[2.2.1]hept-2-ene and 100 mg. of dichloro bis(benzonitrile)palladium and heated in a rocking bomb heater for 4 hrs. at 140° C. After cooling, the reaction mixture was diluted with an equal volume of benzene and poured into 250 ml. of methanol and the white solid polymer which precipitated out was collected. After reprecipitation from benzene-methanol and drying for 2 hrs. under vacuum a yield of 130 mg. of poly(5,5-dimethylbicyclo[2.2.1]hept-2-ene) having a melting point of 232° C. was obtained. The infrared spectrum (KBr) showed no detactable unsaturation.

EXAMPLE 3

*Polymerization of 5-vinylbicyclo[2.2.1]hept-2-ene*

A nitrogen filled, capped, glass-tube was charged with 10 ml. of 5-vinylbicyclo[2.2.1]hept-2-ene and 100 mg. of dichloro bis(benzonitrile)palladium and heated overnight at 130° C. in a rocking bomb heater. The reaction product, a pale green transparent glass, was dissolved in benzene, filtered, poured into acetone, filtered again, and then dried under vacuum to give a yield of 6.93 g. of poly(5-vinylbicyclo[2.2.1]hept-2-ene).

*Analysis.*—Calcd. for $(C_9H_{12})_x$: C, 89.94; H, 10.06. Found. C, 89.05; H, 9.94. Mol. weight (thermometric): 2926, 2949.

The infrared spectrum (KBr) showed the bands due to the vinyl group, unchanged in position and relative intensity compared to the monomer, but was free of the band due to the strained ring double bond.

EXAMPLE 4

*Polymerization of bicyclo[2.2.1]hept-2-ene-5-carbonitrile*

A nitrogen filled, capped, glass tube was charged with 10 g. of bicyclo[2.2.1]hept-2-ene-5-carbonitrile and 100 mg. of dichloro bis(benzonitrile)palladium and heated for 18 hrs. at 140° C. in a rocking bomb heater. The reaction product, a transparent light-brown glass at 140° C. which shattered on cooling, was dissolved in 100 ml. of acetonitrile, treated with charcoal, and then filtered into a 1:1 mixture of ethyl ether and pentane. The precipitate which formed was a grayish-white solid weighing 6.42 g. after drying under vacuum. After reprecipitation from ethyl ether-pentane, there was obtained 3.0 g. of poly(bicyclo[2.2.1]hept-2-ene-5-carbonitrile) having a melting point of 309–316° C.

*Analysis.*—Calcd. for $(C_8H_9N)_x$: C, 80.64; H, 7.61; N, 11.75. Found: C, 78.12; H, 7.68; N, 10.87.

The infrared spectrum of the polymer was devoid of absorptions due to carbon-carbon double bonds but showed the characteristic nitrile group absorption.

EXAMPLE 5

*Polymerization of 2-hydroxymethylbicyclo[2.2.1]hept-5-enyl acetate*

A nitrogen filled, capped, glass tube was charged with 10 g. of 2-hydroxymethylbicyclo[2.2.1]hept-5-enyl acetate and 100 mg. of dichloro bis(benzonitrile)palladium and heated for 10.5 hours at 140° C. in a rocking bomb heater. After cooling to room temperature, the reaction mixture, a viscous liquid, was diluted with 20 ml. of ethyl acetate, filtered, and added to 800 ml. of petroleum ether. The white precipitate which formed initially soon became gummy and adhered to the walls of the flask. The liquid portion was decanted and the residue was dissolved in ethyl acetate and reprecipitated in petroleum ether to yield, after drying under vacuum, 320 mg. of poly(2-hydroxymethylbicyclo[2.2.1]hept-5-enyl acetate) having a melting point of 160° C. and a molecular weight (thermometric) of 2018. The infrared spectrum (KBr) of the polymer was devoid of absorption due to carbon-carbon double bonds but showed the characteristic carboxyl absorption.

EXAMPLE 6

*Polymerization of bicyclo[2.2.1]hept-5-ene-2-carboxylic acid*

A nitrogen filled, capped, glass tube was charged with 10 g. of bicyclo[2.2.1]hept-5-ene-2-carboxylic acid and 100 mg. of dichloro bis(benzonitrile)palladium and heated for 10.5 hrs. at 140° C. in a rocking bomb heater. After cooling to room temperature, the reaction product, a clear, tan-tinted glass was dissolved in warm dioxane, filtered, and then added dropwise with stirring to 1000 ml. of methylcyclohexane. The white precipitate that formed was collected and after drying, first at 55° C. and 1 mm. of Hg and then at 100° C. and 1 mm. of Hg, a yield of 5.75 g. of poly(bicyclo[2.2.1]hept-5-ene-2-carboxylic acid) having an average molecular weight of 1129 was obtained. In the melting point determination, a trace of liquid was evolved above 250° C. and the polymer yellowed slightly above 270° C. and darkened to brown above 340° C. but was still solid at 375° C. The infrared spectrum of the polymer indicated that the structure was that of poly(bicyclo[2.2.1]hept-5-ene-2-carboxylic acid).

EXAMPLE 7

*Polymerization of N,N-dimethylbicyclo[2.2.1]hept-2-ene-5-carboxamide*

A nitrogen filled, capped, glass tube was charged with 10 ml. of N,N-dimethylbicyclo[2.2.1]hept-2-ene-5-carboxamide and 200 mg. of dichloro bis(benzonitrile)palladium and heated for 16 hrs. at 130° C. in a rocking bomb heater. The reaction product, which was brown in color and very viscous, was dissolved in methyl ethyl ketone, filtered, and then added dropwise to petroleum ether. The poly(N,N - dimethylbicyclo[2.2.1]hept - 2-ene-5-carboxamide) precipitate which formed was dried under vacuum and found to have a melting point of 188–204° C.

*Analysis.*—Calcd. for $(C_{10}H_{15}HO)_x$: C, 72.7; H, 9.14; N, 8.47. Found: C, 70.39; H, 9.13; N, 8.24.

The infrared spectrum of the polymer indicated that the structure was that of poly(N,N-dimethylbicyclo[2.2.1]hept-2-ene-5-carboxamide).

EXAMPLE 8

*Polymerization of 5-chloromethylbicyclo[2.2.1]hept-2-ene*

To a 250 ml. glass flask there were charged 190 g. of 5-chloromethylbicyclo[2.2.1]hept-2-ene and 450 mg. of dichloro bis(benzonitrile)palladium. The solution, which was an orange-red color, was heated with stirring under a nitrogen atmosphere and at a temperature of about 100° C. the color faded to yellow and on further heating darkened again to become a deep red, viscous liquid containing a black suspension after 12 hrs. The reaction mixture was dissolved in 300 ml. of benzene, treated with charcoal, and filtered into 2 liters of stirred methanol. The white precipitate which formed was filtered off and after vacuum drying weighed 47 g. About two-thirds of this material was reprecipitated twice and vacuum dried to yield 26 g. of poly(5-chloromethylbicyclo[2.2.1]hept-2-ene with a melting point of 188–192° C.

Analysis.—Calcd. for $(C_8H_{11}Cl)_x$: C, 67.37; H, 7.78; Cl, 24.85. Found: C, 67.61; H, 7.78; Cl, 29.46. Mol. weight (thermometric): 1053.

EXAMPLE 9

*Polymerization of 5-hydroxymethylbicyclo[2.2.1] hept-2-ene*

To a 2-liter glass flask there were charged 1000 g. of 5-hydroxymethylbicyclo[2.2.1]hept-2-ene and 3.5 g. of dichloro bis(benzonitrile)palladium. The orange-yellow solution was heated with stirring under a nitrogen atmosphere and become a pale yellow-green at a temperature of about 100° C. At about 138° C., the polymerization reaction become exothermic and a temperature of 140 to 145° C. was maintained by cooling the flask. After about 2 hrs., the reaction mixture was black and too viscous to stir and the flask was cooled. The reaction product was dissolved in 1.5 liters of boiling ethanol, treated with 5 g. of charcoal, and filtered twice and then the clear filtrate was added dropwise with vigorous stirring to 15 liters of n-butyl ether. A granular polymer precipitated out and was separated, slurried with 4 liters of acetone, filtered and dried on a large rotary evaporator at 100° C. and 2 mm. of Hg. The yield was 730 g. of poly(5-hydroxymethylbicyclo[2.2.1]hept-2-ene) which decomposed slowly at above 280° C.

Analysis.—Calcd. for $(C_8H_{12}O)_x$: C, 77.38; H, 9.74. Found: C, 75.99; H, 9.96. Molecular weight (thermometric): 1452, 1504.

The infrared spectrum (KBr) showed no double bonds in the polymer.

EXAMPLE 10

*Polymerization of 5-hydroxymethylbicyclo[2.2.1] hept-2-ene*

To a 2-liter glass flask there were charged 800 g. of freshly distilled 5-hydroxymethylbicyclo[2.2.1]hept-2-ene (80% endo, 20% exo) and 2.8 g. of dichloro bis(benzonitrile)palladium. The mixture was stirred under nitrogen at 60 to 150° C. for 7 hours, and then 450 ml. of 95% ethanol were added and the hot alcohol solution was filtered, cooled and dropped slowly into 12 liters of n-butyl ether. The precipitate was filtered off, washed by stirring with acetone, and dried at 76° C. and 1 mm. Hg to yield 731 g. of poly(5-hydroxymethylbicyclo[2.2.1]hept-2-ene) with a molecular weight of 850 and a softening point of 260° C.

EXAMPLE 11

*Polymerization of 5,6-bis(hydroxymethyl)bicyclo [2.2.1]hept-2-ene*

A nitrogen filled, capped, glass tube was charged with 10 g. of 5,6-bis(hydroxymethyl)bicyclo[2.2.1]hept-2-ene and 100 mg. of dichloro bis(benzonitrile)palladium and heated in a rocking bomb heater for 4 hrs. at 140° C. After cooling, the reaction mixture was diluted with an equal volume of chloroform and filtered into 30 ml. of petroleum ether. The white solid precipitate was recovered and after vacuum drying the yield was 19 g. of poly(5,6-bis(hydroxymethyl)bicyclo[2.2.1]hept-2-ene) which decomposed at temperatures above 200° C.

Analysis.—Calcd. for $(C_9H_{14}O_2)_x$: C, 70.2; H, 9.16. Found: C, 70.40; H, 8.62.

The infrared spectrum (KBr) did not show any bands attributable to unsaturation.

EXAMPLE 12

*Polymerization of 5-isocyanatomethylbicyclo[2.2.1] hept-2-ene*

A nitrogen filled, capped, glass tube was charged with 10 g. of 5-isocyanatomethylbicyclo[2.2.1]hept-2-ene and 100 mg. of dichloro bis(benzonitrile)palladium and heated for 18 hrs. at 140° C. in a rocking bomb heater. The reaction product, a transparent light brown glass at 140° C. which shattered on cooling, was dissolved in 100 ml. of toluene and the resulting solution was treated with charcoal and filtered into 800 ml. of a 1:1 mixture of pentane and ethyl ether. The precipitate which formed was washed with hexane and then reprecipitated to yield 6.0 g. of poly(5 - isocyanatomethylbicyclo[2.2.1]hept - 2-ene).

Analysis.—Calcd. for $(C_9H_{11}NO)_x$: C, 72.45; H, 7.43; N, 9.39. Found: C, 72.20; H, 7.33; N, 8.40.

The infrared spectrum (KBr) of the polymer was devoid of absorptions due to carbon-carbon double bonds but showed the characteristic isocyanate absorption.

EXAMPLE 13

*Polymerization of 5-methylenebicyclo[2.2.1]hept-2-ene*

A nitrogen filled, capped, glass tube was charged with 10 ml. of 5-methylenebicyclo[2.2.1]hept-2-ene and 100 mg. of dichloro bis(benzonitrile)palladium and heated for 18 hrs. at 140° C. in a rocking bomb heater. The reaction product, a transparent glass with a greenish tint, was crushed and dissolved in 55 ml. of warm benzene and then filtered into 300 ml. of acetone. The white precipitate was filtered off and dried under vacuum to give a yield of 6.66 g. of poly(5-methylenebicyclo[2.2.1]hept - 2 - ene) melting at above 250° C.

Analysis.—Calcd. for $(C_8H_{10})_x$: C, 90.50; H, 9.50. Found: C, 89.25; H, 9.08. Molecular weight (thermometric): 2922, 2909.

The infrared spectrum (KBr) revealed the absorption bands attributable to the methylene group but the absorption band due to the strained ring double bond could not be detected.

5-methylenebicyclo[2.2.1]hept-2-ene was polymerized in a similar manner using preformed $PdCl_2$-methylenebicycloheptene complex as catalyst and the infrared spectrum of the resulting polymer was identical to that described above.

EXAMPLE 14

*Polymerization of 5-methylenebicyclo-[2.2.1]hept-2-ene*

Polymerization of 5-methylenebicyclo [2.2.1]hept-2-ene was carried out in a similar manner to that described in Example 13 using an equal weight of dichloro bis (triphenylphosphine)palladium as catalyst in place of the dichloro bis-(benzonitrile)palladium. A yield of 2.18 grams of poly(5-methylenebicyclo[2.2.1]hept - 2-ene) having a molecular weight of 3860 was obtained.

EXAMPLE 15

*Polymerization of exo-dicyclopentadiene*

To a 150 ml. glass flask there were charged 75 g. of exo-dicyclopentadiene and 500 mg. of dichloro bis-(benzonitrile)-palladium and the solution was heated with stirring under a nitrogen atmosphere. The temperature was rapidly raised to 120° C., then increased to 140° C. over a period of 2.6 hrs. and maintained there for an additional 2 hrs. The reaction product, a very viscous liquid, was dissolved in 200 ml. of hot benzene, treated with charcoal, and filtered into 1 liter of acetone. The precipitate which formed was recovered, reprecipitated from benzene-acetone and dried under vacuum to give a yield of 32 g. of exo-dicyclopentadiene homopolymer having a melting point of 270–274° C.

*Analysis.*—Calcd. for $(C_{10}H_{12})_x$: C, 90.85; H, 9.15. Found: C, 89.99; H, 9.10. Molecular weight (thermometric): 2404.

The infrared spectrum (KBr) showed no absorption band due to the strained ring double bond but bands corresponding to an unstrained cis-internal type double bond were present.

EXAMPLE 16

*Polymerization of endo-dicyclopentadiene*

To a 1-liter glass flask there were charged 500 g. of endo-dicyclopentadiene and 3.34 g. of dichloro bis(benzonitrile) palladium and the solution was heated with stirring under a nitrogen atmosphere. After heating for 8 hrs. at 150–160° C. and 7 hrs. at 170° C. the reaction mixture, a viscous liquid, was diluted with xylene, treated with charcoal, and filtered into 5 liters of acetone. The precipitate which formed was recovered and reprecipitated twice from xylene-acetone to yield 99 g. of endo-dicyclopentadiene homopolymer, a cream colored powder which darkened slightly above 230° C. but was still solid at 280° C. The molecular weight (thermometric) of the polymer was 1358. The infrared spectrum (KBr) showed no absorption band due to the strained ring double bond but bands corrseponding to an unstrained cis-internal type double bond were present.

EXAMPLE 17

*Polymerization of tetracyclo[6.2.1.0$^{2,7}$]undeca-4,9-diene*

A nitrogen filled, capped, glass tube was charged with 10 g. of tricyclo[6.2.1.0$^{2,7}$]undeca-4,9-diene and 100 mg. of dichloro bis(benzonitrile)palladium and heated for 10.5 hours at 140° C. in a rocking bomb heater. After cooling to room temperature, the reaction mixture, a very viscous tan liquid, was dissolved in 100 ml. of benzene, filtered, and then added dropwise to 400 ml. of stirred methanol. The precipitate which formed was recovered and dried under vacuum to give a yield of 4.0 g. of tricyclo[6.2.1.0$^{2,7}$]undeca-4,9-diene homopolymer having a molecular weight (thermometric) of 1987 and a melting point of above 275° C.

The infrared spectrum (KBr) o fthe polymer was devoid of absorption bands due to the bicycloheptene double bond but contained the absorption bands of the cyclohexene type double bond and was thus consistent with polymerization through the bicycloheptene double bond.

EXAMPLE 18

*Polymerization of tetracyclo[6.2.1.1$^{3,6}$0$^{2,7}$]-dodec-4-ene*

A nitrogen filled, capped, glass tube was charged with 10 ml. of tetracyclo[6.2.1.1$^{3,6}$0$^{2,7}$]dodec-4-ene and 100 mg. of dichloro bis(benzonitrile)palladium and heated for 16 hrs. at 135° C. in a rocking bomb heater. After cooling, the reaction mixture, a viscous yellow liquid, was dissolved in benzene and filtered into methanol. The precipitate which formed was collected, reprecipitated and dried under vacuum to yield 680 mg. of tetracyclo[6.2.1.1$^{3,6}$0$^{2,7}$]dodec-4-ene homopolymer having a melting point of 231 to 238° C.

*Analysis.*—Calcd. for $(C_{12}H_{16})_x$: C, 89.94; H, 10.06. Found: C, 88.27; H, 10.0.

The infrared spectrum (KBr) of the polymer was devoid of carbon-carbon double bond absorptions.

EXAMPLE 19

*Polymerization of bis(5-hydroxymethyl)bicyclo[2.2.1]hept-2-ene*

Bis(5-hydroxymethyl)bicyclo[2.2.1]hept-2-ene, 1.55 mole, 240 g., 37.5 g. of n-butanol (distilled from NaBH$_4$) and 950 mg. of dichloro bis(benzonitrile)palladium were mixed in a 1000 ml. resin flask under nitrogen. On heating, the mixture became a homogeneous dark brown liquid at 100° C. The reaction became exothermic near 134° C. but was maintained at 130°–140° C. by heating and cooling as required over a 3 hour period. Stirring at about 124° C. was continued for 2.25 hrs., then 200 ml. of methanol was added.

To the cool reaction mixture was added 2 g. of KOH and 20 ml. of methanolic formaldehyde (40%). After dilution with 200 ml. of methanol the mixture was filtered, the filter was washed with 100 ml. of boiling methanol and the combined filtrates were diluted with 500 ml. of methanol and refluxed. After filtration the solution was stripped of all but 700 ml. of methanol and the polymer was precipitated in a solution of 5500 ml. of acetone and 1000 ml. of n-butyl ether. The white precipitate was washed twice with 2000 ml. of acetone and air dried after drying for 3 hrs. at 60°/5 mm. Hg to yield 124 g. of poly(bis(5-hydroxymethyl)bicyclo[2.2.1]hept-2-ene) having a melting point of 290° C.

*Analysis.*—Calcd. for $(C_9H_{14}O_2)_x$: C, 70.06; H, 9.16. Found: C, 69.88; H, 9.09. Molecular weight (differential vapor pressure, dimethylformamide at 100° C.): 1642, 1664.

EXAMPLE 20

*Polymerization of 3(1,1-dioxotetrahydrothienyl)-(5-bicyclo[2.2.1]hept-2-enyl)methyl ether*

3(1,1-dioxotetrahydrothienyl)(5-bicyclo[2.2.1]-hept-2-enyl)methyl ether, 95.2 g., and 1.43 g. of dichloro bis(benzonitrile)palladium were stirred together under nitrogen and heated rapidly to 93° C. and then an additional 1.0 g. of dichloro bis(benzonitrile)palladium was added. The solution increased steadily in viscosity during continued heating at 125–132° C. and after five hours reaction time was too viscous to stir. It was diluted with 100 ml. of acetonitrile, cooled, and clarified by admixture with charcoal and filtration. After precipitation in methanol and drying at 100° C. and 1 mm. of Hg there was obtained 46.8 g. of 3(1,1-dioxotetrahydrothienyl)(5-bicyclo[2.2.1]hept-2-enyl)methyl ether homopolymer, a light cream colored solid that softens above 160° C.

*Analysis.*—Calcd. for $(C_{12}H_{15}SO_3)$: C, 59.5; H, 7.48. Found: C, 58.8; H, 7.51. Mloecular weight (differential vapor pressure, dimethylformamide at 100° C.): 2014.

The infrared spectrum (KBr) showed bands characteristic of the

group and no bands attributable to bicycloheptene or trans type double bonds.

EXAMPLE 21

*Copolymerization of bicyclo[2.2.1]hept-2-ene and 5-vinylbicyclo[2.2.1]hept-2-ene*

To a slurry of 2.0 g. of dichloro bis(benzonitrile) palladium in 150 ml. of ethylbenzene there were added 192 g. of bicyclo[2.2.1]hept-2-ene and 240 g. of 5-vinylbicyclo-[2.2.1]hept-2-ene. The mixture was warmed to 117° C. under an atmosphere of nitrogen to give a homogeneous solution and then heated for 14 hrs., with the temperature rising slowly to 131° C. and the solution becoming very viscous. After cooling to 90° C., 20 ml. of 40% methanolic formaldehyde was added, followed by 3 ml. of 10% methanolic KOH. The mixture was then diluted with 200 ml. of hot benzene, filtered and added slowly to 5 volumes of well stirred acetone. Upon washing with acetone and drying at 60° C. and 1 mm. Hg, the yield was 310 g. of a copolymer of bicyclo[2.2.1]hept-2-ene and 5-vinylbicyclo[2.2.1]hept-2-ene, melting at above 325° C. and with a molecular weight of 1351.

EXAMPLE 22

*Copolymerization of 5-hydroxymethylbicyclo[2.2.1]hept-2-ene and 5-chloromethylbicyclo[2.2.1]hept-2-ene*

A mixture of 0.25 mole 5-hydroxymethylbicyclo[2.2.1]hept-2-ene, 0.75 mole 5-chloromethylbicyclo[2.2.1]hept-2-ene and 300 mg. of dichloro bis(benzonitrile)palladium was stirred under nitrogen for 8.5 hrs. at 130–140° C. At the end of this period the viscous reaction mixture was cooled, diluted with 100 ml. of methylene chloride, filtered, and added slowly to 2 liters of vigorously stirred methanol. The precipitate was washed and dried at 100° C./1.5 mm. to yield 24 g. of a copolymer of 5-hydroxymethylbicyclo[2.2.1]hept-2-ene and 5-chloromethylbicyclo[2.2.1]hept-2-ene melting at 238 to 242° C. The analysis of the copolymer was as follows: C, 71.65; H, 8.36; Cl, 14.15, which corresponds with a copolymer containing 58 percent of 5-chloromethylbicyclo[2.2.1]hept-2-ene.

In a similar manner a mixture of 0.75 mole 5-hydroxymethylbicyclo[2.2.1]hept-2-ene and 0.25 mole 5-chloromethylbicyclo[2.2.1]hept-2-ene was copolymerized to give a product with an analysis as follows: C, 75.52; H, 9.42; Cl, 3.48, which corresponds with a copolymer containing 14 percent of 5-chloromethylbicyclo[2.2.1]hept-2-ene.

EXAMPLE 23

*Copolymerization of 5-hydroxymethylbicyclo[2.2.1]hept-2-ene and bicyclo[2.2.1]hept-2-ene-5-carbonitrile*

To a 2-liter resin flask there were charged 250 g. of 5-hydroxymethylbicyclo[2.2.1]hept-2-ene, 250 g. of bicyclo[2.2.1]hept-2-ene-5-carbonitrile, 100 ml. of diethyl ether of ethylene glycol and 3.5 g. of dichloro bis(benzonitrile) palladium. After heating at 135 to 140° C. for 6.5 hrs., 100 ml. of diethyl ether of ethylene glycol, 50 ml. of methanolic formaldehyde and 100 ml. of ethanol were added and the mixture was heated for an additional 0.5 hour, then cooled, filtered and dropped into 5.6 liters of stirred n-butyl ether. Upon washing, filtering and drying the yield was 295.5 g. of a copolymer of 5-hydroxymethylbicyclo[2.2.1]hept-2-ene and bicyclo[2.2.1]hept-2-ene-5-carbonitrile with a molecular weight of 1127 and which sintered and darkened at 273° C. but did not melt at 300° C.

EXAMPLE 24

*Copolymerization of 5-vinylbicyclo[2.2.1]hept-2-ene and endo-bicyclo[2.2.1]hept-2-ene-5-dicarboxylic acid anhydride*

A mixture of 125 g. of 5-vinylbicyclo[2.2.1]hept-2-ene, 25 g. of endo-bicyclo[2.2.1]hept-2-ene-5,6-dicarboxylic acid anhydride and 500 mg. of dichloro bis(benzonitrile) palladium was heated for 5 hours at 136 to 140° C. At the end of this time, the viscous reaction product was dissolved in 250 ml. of benzene, filtered, and dropped into 2 liters of acetone. The white precipitate which formed was collected, washed with acetone and dried in a rotary evaporator to yield 63.5 g. of a copolymer of 5-vinylbicyclo[2.2.1]hept-2-ene and endo-bicyclo[2.2.1]hept-2-ene-5,6-dicarboxylic acid anhydride having a molecular weight of 1158.

Analysis.—Calcd. for $C_9H_{12}$: C, 90.0; H, 10.0. Found: C, 86.17; H, 9.5.

The infrared spectrum ($CCl_4$) showed the strong bands of poly(vinylbicycloheptene) and also bands corresponding to the anhydride group.

EXAMPLE 25

*Polymerization of bicyclo[2.2.1]hept-2-ene*

A nitrogen-filled pressure bottle was charged with 47.0 g. of bicyclo[2.2.1]hept-2-ene, 5.0 g. of toluene and 0.85 g. of dichloro bis(benzonitrile)palladium and stirred for 20 hours at room temperature. The reaction product was then diluted with toluene and added to methanol and the precipitate which formed was collected and washed to yield 35.8 g. of poly(bicyclo[2.2.1]hept-2-ene), a white solid that was insoluble in boiling toluene and darkened at above 320° C.

EXAMPLE 26

*Polymerization of 5-hydroxymethylbicyclo[2.2.1]hept-2-ene*

A nitrogen-blanketed reaction flask was charged with 50 g. of 5-hydroxymethylbicyclo[2.2.1]hept-2-ene and 1.0 of dichloro bis(benzonitrile)palladium and the contents stirred at room temperature for 24 hours. The viscous slurry was diluted with 50 ml. of ethanol and added to 550 ml. of n-butyl ether. The yield was 21 g. of poly(5-hydroxymethylbicyclo[2.2.1]hept-2-ene).

EXAMPLE 27

*Polymerization of bicyclo[2.2.1]hept-2-ene*

A nitrogen-blanketed reaction flask was charged with 50 g. of bicyclo[2.2.1]hept-2-ene, 5 ml. of toluene, and 1.0 g. of palladium diacetate. The reaction mixture was stirred for 26 hours at room temperature and then was diluted with 50 ml. of toluene and dropped into 550 ml. of methanol. After washing and drying, 5.0 g. of solid polymer was obtained and upon reprecipitation from toluene/methanol the yield was 1.2 g. of solid white poly(bicyclo[2.2.1]hept-2-ene) having a molecular weight of 2144.

EXAMPLE 28

*Polymerization of 5-hydroxymethylbicyclo[2.2.1]hept-2-ene*

A reaction tube was charged with 15 g. of 5-hydroxymethylbicyclo[2.2.1]hept-2-ene, 2.25 g. of n-butanol and 0.044 g. of dichloro(endo-dicyclopentadiene)palladium, then was flushed with nitrogen, sealed and heated at 130° C. for 7 hours in a rocking tube oven. The contents of the cooled tube were added to 40 ml. of hot ethanol and the polymer was precipitated by addition of the ethanol solution to n-butyl ether. After washing with acetone and drying there was obtained 5.4 g. of white poly(5-hydroxymethylbicyclo[2.2.1]hept-2-ene) having a molecular weight of 1540 and melting at 290 to 310° C.

EXAMPLE 29

*Polymerization of bicyclo[2.2.1]hept-2-ene*

A reaction tube was charged with 11.4 g. of bicyclo[2.2.1]hept-2-ene, 1.7 g. of toluene and 0.033 g. of dichloro(endo - dicyclopentadiene)palladium, then was flushed with nitrogen, sealed and heated at 130° C. for 7 hrs. in a rocking tube oven. The tube contents were dissolved in hot toluene, and after filtration the toluene solution was added to 300 ml. of methanol. The white precipitate which formed was washed and dried to give a yield of 2.6 g. of poly(bicyclo[2.2.1]hept-2-ene) having a molecular weight of 1455 and softening at temperatures of 205 to 230° C.

EXAMPLE 30

*Polymerization of 5-hydroxymethylbicyclo-[2.2.1]hept-2-ene*

A 1-liter stainless steel reaction flask was charged with 272 g. of 5-hydroxymethylbicyclo[2.2.1]hept-2-ene, 41 g. of n-butanol and 760 mg. of dichloro(5-vinylbicyclo-[2.2.1]hept-2-ene)palladium. The nitrogen-blanketed reaction mixture was stored at 135–140° C. for 2.5 hrs. after which it was too viscous to stir. The flask contents were dissolved in 600 ml. of boiling methanol and treated with 5 g. of KOH and 10 ml. of 98% formic acid. The resulting solution was filtered and then added to 5000 ml. of n-butyl ether. The white precipitate which formed was washed and dried at 60° C./1 mm. Hg to give a yield of 200 g. of poly(5-hydroxymethylbicyclo[2.2.1]hept-2-ene) having a molecular weight of 1150 and softening at above 235° C.

It is emphasized that, as hereinbefore disclosed, the polymers prepared in the above examples showed in every instance an analysis and infrared spectrum consistent with a polymer composed of repeating structural units which comprise a bicycloheptanylene radical, the structural units being joined directly to one another at the 2-position and 3-position carbon atoms of the bicycloheptanylene radical. Accordingly, the polymers of this invention were distinctly different in structure and chemical characeristics from the polymers of bicyclo[2,2,1]hept-2-enes known to the prior art.

PREPARATION OF POLYURETHANE FOAMS: EXAMPLES 31–32

EXAMPLE 31

Propylene oxide (268 grams) was added slowly over a period of 21 hours and at a temperature of 140 to 180° C. to 139 grams of the poly(5-hydroxymethylbicyclo-[2.2.1]hept-2-ene) of Example 9 slurried in 200 ml. of diethylene glycol diethyl ether. Potassium hydroxide (3.6 grams) was used to catalyze the addition reaction and was added before heating the reaction mixture. After removing the diethylene glycol diethyl ether by distillation, the reaction product was diluted with methanol and passed through a column of strong acid ion exchange resin to remove the potassium hydroxide and then the diluent was removed under reduced pressure at 175° C. The propylene oxide-poly(5-hydroxymethylbicyclo[2.2.1]hept-2-ene) addition product was recovered and its hydroxyl number determined by reacting it with acetic anhydride in pyridine solution at refluxing temperature, hydrolyzing the excess anhydride, and then titrating the acetic acid formed with standard base using phenolphthalein as an indicator. The hydroxyl number of the propylene oxide-poly(5-hydroxymethylbicyclo[2.2.1]hept-2-ene) addition product was 199 which corresponds to an average polyether chain length of 2.74 propylene oxide units.

The propylene oxide-poly(5 - hydroxymethylbicyclo-[2.2.1]hept-2-ene) addition product prepared above was foamed by the one-shot technique employing the following recipe: 200 grams of the poly(5-hydroxymethylbicyclo-[2.2.1]hept-2-ene)propylene oxide adduct, 45.6 grams trichloromonofluoromethane, 1.7 grams silicone oil surfactant (of the formula:

$$CH_3Si[(OSiMe_2)_{6.2}(OC_2H_4)_{18}(OC_3H_6)_{14}OBu]_3$$

where Me represents a methyl radical and Bu represents a butyl radical), 1.7 grams dibutyltin dilaurate, 0.57 gram N,N,N',N'-tetramethyl - 1,3 - butanediamine, and 64.9 grams of an 80/20 mixture of 2,4- and 2,6-tolylene diisocyanate.

The poly(5 - hydroxymethylbicyclo[2.2.1]hept-2-ene) propylene oxide adduct and the trichloromonofluoromethane were charged to a stainless steel beaker and stirred until a uniform solution was obtained. Then the dibutyltin dilaurate and the silicone oil surfactant were added and blended in. After the tolylene diisocyanate was added the mixture was stirred vigorously, then poured into a preheated (70° C.) collapsible stainless steel mold, 8 inches x 8 inches x 6 inches high, and allowed to foam. The resulting foam was cured for ten minutes in a 70° C. oven to yield a rigid, non-friable product.

EXAMPLE 32

To a 12 liter reaction flask there were charged 1057 g. of poly(5-hydroxymethylbicyclo[2.2.1]hept-2-ene (prepared in a manner similar to that described in Example 9) dissolved in a equal weight of dimethylsulfoxide and 1.05 g. of potassium hydroxide and the mixture was heated with stirring in a nitrogen atmosphere to 160° C. Addition of propylene oxide was begun, but there was very little reaction with the polyol even at 160–180° C. An additional 7.2 g. potassium hydroxide was added, and after several hours most of the 863 g. propylene oxide which had been slowly added had reacted. The reaction product was then dissolved in isopropyl alcohol and passed successively through columns of strong base and strong acid ion exchange resins. After stripping solvent from the product, it was found to have a hydroxyl number of 265.6, which corresponds to an average addition of 1.5 moles of propylene oxide to each hydroxyl group of the original polyol. If all of the propylene oxide charged had reacted, the average oxypropylene chain length would have been 1.73.

One thousand six hundred seventy-two g. of the above propylene oxide adduct was charged to a 5 ml. glass reaction flask, 1.7 g. of potassium hydroxide was added, and propylene oxide was charged at 160–170° C. so as to maintain a slight reflux, until 228 g. propylene oxide had reacted. This product was diluted with isopropyl alcohol, and passed successively through columns of strong base and strong acid ion exchange resins. After stripping the eluate to 130° C. at 1 mm., there was obtained 1519 g. of material having a hydroxyl number of 241.4, which corresponds to an average oxypropylene chain length of 1.88 units. This product was a dark, extremely viscous liquid at room temperature.

In a similar manner to that described in Example 31, rigid polyurethane foams were prepared from the above-described propylene oxide-poly(5-hydroxymethylbicyclo [2.2.1]hept-2-ene) addition product employing the following recipes:

| | A, g. | B, g. |
|---|---|---|
| Poly(5-hydroxymethylbicyclo[2.2.1]-hept-2-ene)-propylene oxide adduct | 140 | 140 |
| Polymethylene polyphenylisocyanate [1] | 86.2 | 55.2 |
| Trichloromonofluoromethane | 42 | 33.6 |
| Dibutyltin dilaurate | 0.7 | 0.7 |
| N,N,N',N'-tetramethyl-1,3-butanediamine | 0.28 | |
| Surfactant [2] | 2.10 | 2.10 |

[1] The phosgenated product of the condensation product of aniline and formaldehyde, said phosgenated product having an average of about 3 isocyanate groups per molecule and an average molecular weight of about 380–400.
[2] A silicone oil of the formula:
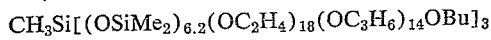
where Me represents a methyl radical.

The foams prepared from recipes A and B exhibited cream times, rise times, and tack-free times of 15, 50, 40 and 16, 80, 80 seconds, respectively. After several days at room temperature, the maximum shrinkage of any face of either foam measured perpendicular to the face was 1/16 inch.

PREPARATION OF POUR POINT DEPRESSANTS: EXAMPLES 33–47

EXAMPLE 33

Sixty-two grams of the poly(5-hydroxymethylbicyclo-[2.2.1]hept-2-ene) of Example 9, were slurried with 145 g. (0.6 mole) of methyl myristate and 0.5 g. of sodium methoxide and the admixture was charged to a glass flask equipped with a stirrer and distillation side arm. The mixture was heated under $N_2$ for 6 hours at temperatures of 120 to 168° C. and then an additional 0.5 g. of sodium methoxide was added and heating continued for 6 hours at 200–230° C. The reaction was completed by heating the mixture at 245–264° C. for an additional four hours. After cooling the reaction flask, the viscous reaction product was diluted with 250 ml. of petroleum ether, filtered, washed twice with methanol and stripped of volatiles on a rotary evaporator at 65° C./1 mm. Hg. The residue from the evaporator was charged to a molecular still operated at 220° C./2 mm. Hg and 13 g. of methyl myristate was recovered as the distillate and 72 g. of the myristate ester of poly(5-hydroxymethylbicyclo[2.2.1] hept-2-ene), an extremely viscous, amber-colored oil, was obtained as the residue. The infrared spectrum ($CCl_4$) of the esterified poly(5-hydroxymethylbicyclo-[2.2.1]hept-2-ene) showed that only a few percent of the hydroxyl groups in the polyol had remained unreacted.

*Analysis.*—Calcd. for $(C_{22}H_{38}O_2)_x$: C, 78.0; H, 11.45. Found: C, 77.62; H, 10.95

The effectiveness of the above-described myristate ester of poly(5-hydroxymethylbicyclo[2.2.1]hept-2-ene) as a pour point depressant was evaluated in two different base oils and results obtained were as follows:

TABLE I

| Base Oil | Wt. Percent Pour Point Depressant | Pour Point¹ (° F.) |
|---|---|---|
| A | 0 | +10 |
|   | 0.2 | −20 |
| B | 0 | +5 |
|   | 0.2 | −15 |

¹ Determined in accordance with test procedure ASTM D 97–57.
(A) A neutral solvent-refined Mid-Continent oil with a viscosity at 100° F. of 200 SUS.
(B) A neutral solvent-refined Mid-Continent oil with a viscosity at 100° F. of 150 SUS.

In a similar manner, pour point depressants are prepared from poly(5,6-(hydroxyethyl)bicyclo[2.2.1]hept-2-ene) or poly(5-hydroxymethyl-6-hydroxypropylbicyclo[2.2.1]hept-2-ene) in place of the poly(5-hydroxymethylbicyclo[2.2.1]hept-2-ene).

EXAMPLE 34

One hundred and forty-one grams of the poly(5-hydroxymethylbicyclo[2.2.1]hept-2-ene) of Example 9 was slurried with 318 g. (1.31 mole) of methyl myristate, 64 g. (0.3 mole) of methyl laurate and 1.0 g. of sodium methoxide. The mixture was charged to a reaction flask, heated for 4 hours at 250° C. and then worked up in the manner described in Example 33. There were obtained from the molecular still 147 g. of distillate consisting of 20% methyl laurate and 80% methyl myristate and, as the residue, 282 g. of the mixed (80/20) myristate/laurate ester of poly(5-hydroxymethylbicyclo[2.2.1]hept-2-ene), a very viscous, light amber liquid. The infrared spectrum (CC14) of the mixed myristate/laurate ester showed only a trace of unreacted hydroxyl groups.

The mixed myristate/laurate ester prepared above was evaluated as a pour point depressant in five different base oils and the pour point values in ° F., determined in accordance with test procedure ASTM D97–57, are reported below:

TABLE II

| Base Oil | Volume Percent Pour Point Depressant | | | | | |
|---|---|---|---|---|---|---|
| | 0 | 0.05 | 0.1 | 0.2 | 0.3 | 0.4 |
| C | +5 | −15 | −20 | −20 | −35 | −30 |
| D | +10 | −10 | −20 | −30 | −30 | −35 |
| E | 0 | −15 | −20 | −25 | −35 | −35 |
| F | +20 | +10 | 0 | −20 | −20 | −25 |
| G | +15 | +10 | 0 | −30 | −25 | −20 |

(C) Mixture of 60% neutral solvent-refined Mid-Continent oil with a viscosity at 100° F. of 150 SUS and 40% neutral solvent-refined Mid-Continent oil with a viscosity at 100° F. of 400 SUS.
(D) A neutral solvent-refined Mid-Continent oil with a viscosity at 100° F. of 220 SUS.
(E) A neutral solvent-refined Mid-Continent oil with a viscosity at 100° F. of 200 SUS.
(F) A neutral solvent-refined Mid-Continent oil with a viscosity at 100° F. of 200 SUS.
(G) Mixture of 90% neutral solvent-refined paraffin base oil with a viscosity at 100° F. of 170 SUS and 10% paraffin base bright stock with a viscosity at 100° F. of 150 SUS.

EXAMPLES 35–47

Thirteen pour point depressants of varying side chain composition were prepared by ester interchange of methyl esters of saturated fatty acids with the poly(5-hydroxymethylbicyclo-[2.2.1]hept-2-ene) of Example 9. In each case sodium methoxide was employed as the catalyst and the reaction mixture was heated for a period of about 7 hours at a temperature of about 250° C. Infrared analysis of the pour point depressants indicated essentially complete esterification. Each of the mixed fatty acid esters of poly(5-hydroxymethylbicyclo[2.2.1]hept-2-ene) was added in a concentration of 0.2 percent by volume to two different base oils and the pour point values, determined in accordance with ASTM D97–57, are presented in Table III below.

TABLE III

| Example No. | Composition of Fatty Acid Ester Mixture | Average Number of Carbon Atoms | Pour Point, ° F. | |
|---|---|---|---|---|
| | | | Base Oil A¹ | Base Oil B² |
| 35 | 100% C | 13.5 | −10 | −5 |
| 36 | 50% C/50% M | 13.75 | −5 | 0 |
| 37 | 80% C/20% S | 14.4 | −20 | −5 |
| 38 | 50% C/50% P | 14.75 | −15 | 0 |
| 39 | 40% P/40% M/10% L/10% S | 15.0 | −15 | 0 |
| 40 | 40% S/40% L/10% P/10% M | 15.0 | −10 | −5 |
| 41 | 25% S/25% P/25% M/25% L | 15.0 | −10 | −5 |
| 42 | 50% S/50% L | 15.0 | −10 | 0 |
| 43 | 40% S/10% P/40% M/10% L | 15.6 | −15 | 0 |
| 44 | 50% C/50% S | 15.7 | −20 | −10 |
| 45 | 60% P/20% M/20% S | 16.0 | 0 | +5 |
| 46 | 40% S/40% P/20% L | 16.0 | 0 | +5 |
| 47 | 100% S | 18.0 | 0 | 0 |

¹ Described in Example 33 above.
² Described in Example 33 above.
L=Laurate, M=Myristate, P=Palmatate, S=Stearate, C=Coconate.

As shown by the illustrative examples given above the pour point depressants of the present invention are highly effective in lowering the pour point in a wide variety of petroleum-derived lubricating oils. Furthermore, the pour point depressants are fully miscible with common lubricating oil additives such as, for example, viscosity index improvers composed of acrylic or methacrylic acid ester polymers and oil detergents such as the salts of di-substituted thiophosphoric acid. Blends of the novel pour point depressants disclosed herein and the above-described additives form a clear solution that is miscible with the petroleum-derived base oils and no phase separation occurs during prolonged periods of storage of the lubricating oil composition.

PREPARATION OF ALKYD COATINGS RESINS: EXAMPLES 48–51

In the following examples given to illustrate the use of the novel polynorbornenes of this invention in preparation of alkyd coatings resins, parts of reactants are by weight and the following definitions apply unless otherwise indicated:

*Acid number.*—The acid number of the alkyd resins is defined as the number of milligrams of potassium hydroxide required to neutralize the free acid in 1.0 gram of the resin.

*Gardner color.*—The Gardner color of the alkyd resins is a rating on the Gardner scale, which is specifically designed to measure the yellow-amber colors of oils and varnishes and is made up of eighteen standard concentrations of ferric chloride which are rated from 1 to 18 in increasing depth of color. The darkest color on the Gardner scale matches that of 3 grams of potassium dichromate in 100 ml. of sulfuric acid while raw linseed oil, for example, has a color of 11.

*Impact resistance.*—The impact resistance of coatings described herein was measured with a Gardner impact tester on films applied to bonderized steel panels at a thickness of 1.0 to 1.5 mils. The tester, which comprises a round-nose steel impact rod, a vertical guide tube, and a base plate, had a specially modified impact rod designed to deliver up to 320 inch pounds of impact.

*Flexibility.*—The flexibility of coatings described herein was determined according to the Mandrel bend method (ASTM D-522, "Standard Method of Test of Elongation of Attached Lacquer Films With Conical Mandrel Test Apparatus") with the total diameter of the 180° bend varying from ⅛ to 1½ inches. Evaluation of coatings discussed herein is interpreted as either "pass" or "fail" depending on whether the coating remained intact or developed cracks of any sort after bending.

*Sward hardness.*—The hardness of coatings described herein was determined with an I.C.I. Automatic Sward Hardness Rocker, made by Gardner Laboratory, Inc., on films applied to bonderized steel panels at a thickness of 1.0 to 1.5 mils. This instrument measures the relative hardness of coatings surfaces by the pendulum-like oscillations of a circular carriage. The number of these oscillations or "rocks" is dependent on the hardness of the film surface.

*Caustic resistance.*—(1) Air dried films: After air drying seven days at ambient conditions, a 1.0–1.5 mil. film on bonderized steel is immersed in a 2 percent aqueous solution of sodium hydroxide for 4 hours. (2) Baked films: A 1.0–1.5 mil. film on bonderized steel is immersed in 20 per cent aqueous sodium hydroxide for 24 hours.

*Water resistance.*—(1) Air dried films: A 1.0–1.5 mil. film which has been applied to bonderized steel and air dried for seven days at ambient conditions is immersed in distilled water at 23–25° C. for 4 hours. (2) Baked films: A 1.0–1.5 mil. coating on bonderized steel is placed in a beaker of boiling water for one hour.

*Acid resistance.*—(1) Air dried films: A watch glass filled with one per cent sulfuric acid is placed on a 1.0–1.5 mil film on bonderized steel for 4 hours. The film is air dried seven days at ambient conditions prior to the test. (2) Baked films: Acid resistance is determined by placing a watch glass filled with one per cent sulfuric acid on a 1.0–1.5 mil film on bonderized steel for 24 hours.

RATINGS USED IN CHEMICAL TESTS ON AIR DRIED FILMS

| Rating in [1] | 2 Percent NaOH | Distilled Water | 1 Percent $H_2SO_4$ |
|---|---|---|---|
| Excellent | Very slight blush, slight softening, slight loss of adhesion. | Very slight blush, slight softening, slight loss of adhesion. | Softening, slight loss of adhesion, very slight blush. |
| Good | Slight to moderate blush, soft, no adhesion, no discoloration. | Slight blush, soft, no adhesion (wet). | Slight blush, soft, no adhesion. |
| Fair | Moderate to heavy blush, soft, no adhesion (wet), some discoloration, blistering. | Moderate blush, soft, no adhesion. | Moderate blush, soft, no adhesion micro-blisters. |
| Poor | Dissolved or disintegrated. | Heavy blush, soft, no adhesion, small, numerous blisters, discolored. | Heavy blush, soft, no adhesion, small to large blisters. |

RATINGS USED IN CHEMICAL TESTS ON BAKED FILMS

| Rating in [1] | 20 Percent NaOH | Boiling Water | 1 Percent $H_2SO_4$ |
|---|---|---|---|
| Excellent | No change in appearance or hardness. | Unaffected except for a slight loss of gloss at interface. | No change in appearance or hardness. |
| Good | Very slight softening, few small blisters or slight discoloration. | Slight blush, slight softening of film. | Very slight softening and a few small blisters. |
| Fair | Slight softening, small blisters, or slight discoloration. | Softening, moderate blush, loss of adhesion. | Softening, whitening, and loss of adhesion. |
| Poor | Film dissolves. | Heavy blush, large blisters, loss of adhesion. | Blistering, heavy blush, loss of adhesion. |

[1] Ratings intermediate to those given above are indicated by the symbols + and −.

PROPERTIES OF COATINGS PREPARED FROM CONVENTIONAL ALKYD RESINS

Coatings were prepared from conventional alkyd resins in order to permit comparison of their properties with those of coatings prepared from the novel alkyd resins of this invention. The conventional alkyd resins employed were commercially available materials having the following descriptions:

*Resin A.*—A medium oil length alkyd resin produced from glycerol, phthalic anhydride and dehydrated castor oil acids which has an acid number of 4–10 and is marketed as a 50 percent solution in xylene.

*Resin B.*—A general purpose, medium oil length alkyd resin produced from glycerol, phthalic anhydride and soybean oil fatty acids which has an acid number of 6–12 and is marketed as a 50 percent solution in mineral spirits.

*Resin C.*—A long oil length alkyd resin produced from pentaerythritol, phthalic anhydride and soybean oil fatty acids which has an acid number of 4–8 and is marketed as a 70 percent solution in mineral spirits.

The coatings were prepared from each of the above-described alkyd resins by adding to 100 gms. of the resin solution a drier consisting of 0.05 percent cobalt, based on solid resin, as cobalt octoate and 0.10 percent zirconium, based on solid resin, as a zirconium organic complex. The coating compositions were applied to cleaned and sanded raw steel panels by dip coating. Cured coatings of approximately one mil thickness were obtained by either baking 30 minutes at 350° F. or by air drying one week at ambient temperature and humidity. Properties obtained on both the air dried and baked coatings are summarized below.

|  | Resin A | Resin B | Resin C |
|---|---|---|---|
| Baked Coatings: | | | |
| Sward Hardness | 31 | 35 | 8. |
| Impact Resistance, inch lbs. | >320 | >320 | >320. |
| Flexibility, 180° bend, ⅛″ conical mandrel. | Passed | Passed | Passed. |
| Water Resistance | Good− | Good+ | Good−. |
| Caustic Resistance | Poor | Poor | Good−. |
| Acid Resistance | Excellent | Excellent | Excellent. |
| Air Dried Coatings: | | | |
| Sward Hardness | 6 | 16 | 4. |
| Impact Resistance, inch lbs. | 95–100 | >320 | >320. |
| Flexibility, 180° bend, ⅛″ conical mandrel. | Passed | Passed | Passed. |
| Water Resistance | Excellent− | Good | Excellent−. |
| Caustic Resistance | Fair | Poor | Fair−. |
| Acid Resistance | Good− | Good | Fair. |

EXAMPLE 48

To a three-necked glass flask equipped with a mechanical stirrer, a Dean-Stark trap for the removal of water, and a thermometer there were charged 100 parts of the poly(5-hydroxymethylbicyclo[2.2.1]hept-2-ene) of Example 10, 153.5 parts of dehydrated castor oil fatty acids having an iodine value of 153, 22.7 parts of dioleic acid, 0.02 part of triphenylphosphite and 75 parts of xylene. The admixture was heated with stirring to 200±5° C. and maintained at this temperature for a period of 6 hours during which time the water of esterification was removed as the azeotrope with xylene. At the end of this period the reaction product was cooled and diluted with xylene to produce a coating composition containing 63 percent total solids. The coating composition had an acid number of 8.3, a viscosity of 190 cps., and a Gardner color of 10.

Bonderized steel panels were dip coated with the above-described coating composition and the coating, which was 0.8 mil thick, was cured by heating at 350° F. for 30 minutes. The coating properties are summarized in the table below.

Sward hardness _____ 24.
Impact resistance, inch-lbs. _____ >108.
Flexibility, 180° bend, ⅛″ conical mandrel _ Passed.
Water resistance _____ Excellent.
Caustic resistance _____ Good.
Acid resistance _____ Fair.

A comparison of the results presented above with the properties of coatings prepared from commercially available, conventional alkyd resins hereinbefore presented shows that the novel alkyd resin of this example formed a baked coating having superior water resistance to any of the three baked coatings prepared from the commercially available alkyd resins and superior caustic resistance to two of the three.

EXAMPLE 49

In a similar manner to that of Example 48, an alkyd resin was prepared from 36.2 parts of the poly(5-hydroxymethylbicyclo[2.2.1]hept-2-ene) of Example 10, 51.5 parts of dehydrated castor oil fatty acids having an iodine value of 153, and 12.3 parts of dioleic acid. The coating composition prepared from the alkyd resin contained 56 percent total solids, including 0.01% cobalt and 0.5% lead based on the weight of the solid resin, and exhibited an acid number of 9.5, a viscosity of 610 cps. and a Gardner color of 10. A 0.8 mil thick baked coating on bonderite which had been cured by heating for 30 minutes at 350° F. exhibited the following properties:

Sward hardness _____ 24.
Impact resistance, inch-lbs. _____ >108.
Flexibility, 180° bend, ⅛″ conical mandrel _ Passed.
Water resistance _____ Excellent.
Caustic resistance _____ Good.
Acid resistance _____ Good.

A comparison of the results presented above with the properties of coatings prepared from commercially available, conventional alkyd resins hereinbefore presented shows that the novel alkyd resin of this example formed a baked coating which exhibited superior water resistance and caustic resistance to that of baked coatings of the commercially available alkyds.

EXAMPLE 50

In a similar manner to that of Example 48, an alkyd resin was prepared from 40.1 parts of the poly(5-hydroxymethylbicyclo[2.2.1]hept-2-ene) of Example 10, 57.6 parts of tall oil fatty acids and 2.3 parts of maleic acid. The coating composition prepared from the alkyd resin contained 56 percent total solids, including 0.01% cobalt and 0.5% lead based on the weight of the solid resin, and exhibited an acid number of 6.7, a viscosity of 87 cps. and a Gardner color of 8. A 1.0–1.5 mils thick baked coating on bonderite which had been cured by heating for 30 minutes at 350° F. exhibited the following properties:

| | |
|---|---|
| Sward Hardness | 22. |
| Impact resistance, inch-lbs. | >108. |
| Flexibility, 180° bend, ⅛″ conical mandrel | Passed. |
| Water resistance | Excellent. |
| Caustic resistance | Good. |
| Acid resistance | Good. |

A comparison of the results presented above with the properties of coatings prepared from commercially available, conventional alkyd resins hereinbefore presented shows that the novel alkyd resin of this example formed a baked coating which exhibited superior water resistance and caustic resistance to that of baked coatings of the commercially available alkyds.

EXAMPLE 51

Several samples of poly(5-hydroxymethylbicyclo[2.2.1] hept-2-ene) prepared in the manner described in Example 10 were composited to give a total of 1260 g. and dissolved in 2500 ml. of boiling ethanol. The hot solution was filtered, cooled, and then added slowly to 15 liters of n-butyl ether. The precipitate which formed was collected, washed with acetone and dried at 65° C./1 mm. Hg to yield 1040 g. of poly(5-hydroxymethylbicyclo[2.2.1] hept-2-ene) with a softening point above 275° C., a hydroxyl number of 393, and a molecular weight of 2062.

In a similar manner to that of Example 48, an alkyd resin was prepared from 42.4 parts of the above-described poly(5 - hydroxymethylbicyclo[2.2.1]hept - 2-ene), 56.8 parts of soybean oil having an iodine value of 128, and 0.8 part of maleic acid. The coating composition prepared from the alkyd resin contained 60% total solids, including 0.01% cobalt and 0.2% zirconium based on the weight of the solid resin, and exhibited an acid number of 6.26, a viscosity of 182 cps., and a Gardner color of greater than 18. A 1.0–1.5 mil. thick coating on bonderized steel which had been air dried at ambient temperature for one week exhibited the following properties:

| | |
|---|---|
| Sward Hardness | 22. |
| Impact resistance, inch-lbs. | >108. |
| Flexibility, 180° bend, ⅛″ conical mandrel | Passed. |
| Water resistance | Good. |
| Caustic resistance | Fair +. |
| Acid resistance | Good. |

A comparison of the results presented above with the properties of coatings prepared from commercially available, conventional alkyd resins hereinbefore presented shows that the novel alkyd resin of this example formed an air dried coating having superior caustic resistance to any of the three air dried coatings prepared from the commercially available alkyd resins.

Various changes and modification can be made in practicing the present invention without departing from the spirit and scope thereof and therefore it is intended to include in the scope of the appended claims all such modifications and variations as may be apparent to those skilled in the art from the description and illustrative examples given herein.

What is claimed is:

1. Normally solid polymers of bicyclo[2.2.1]hept-2-enes composed of repeating structural units which comprise a bicycloheptanylene radical, said structural units being joined directly to one another at the 2-position and 3-position carbon atoms of said bicycloheptanylene radical, and said bicycloheptanylene radical having hydrogen atoms attached to the 2-position and 3-position carbon atoms thereof and at least 4 hydrogen atoms attached to the remaining carbon atoms thereof.

2. Normally solid polymers of 5-hydrocarbyl-bicyclo[2.2.1]hept-2-enes wherein the hydrocarbyl group contains up to about 20 carbon atoms, said polymers consisting of repeating 5-hydrocarbyl substituted bicycloheptanylene units joined directly to one another at the 2 and 3 positions.

3. Normally solid polymers of 5,6-di(hydrocarbyl)-bicyclo[2.2.1]hept-2-enes wherein each hydrocarbonyl group contains up to about 20 carbon atoms, said polymers consisting of repeating 5,6-di(hydrocarbyl) substituted bicycloheptanylene units joined directly to one another at the 2 and 3 positions.

4. Normally solid polymers of 5-alkyl-bicyclo[2.2.1] hept-2-enes wherein the alkyl group contains up to about 20 carbon atoms, said polymers consisting of repeating 5-alkyl substituted bicycloheptanylene units joined directly to one another at the 2 and 3 positions.

5. Normally solid polymers of 5-haloalkyl-bicyclo[2.2.1]hept-2-enes wherein the haloalkyl group contains up to about 20 carbon atoms, said polymers consisting of repeating 5-haloalkyl substituted bicycloheptanylene units joined directly to one another at the 2 and 3 positions.

6. Normally solid polymers of 5-hydroxyalkylbicyclo[2.2.1]hept-2-enes wherein the hydroxyalkyl group contains up to about 20 carbon atoms, said polymers consisting of repeating 5-hydroxyalkyl substituted bicycloheptanylene units joined directly to one another at the 2 and 3 positions.

7. Normally solid polymers of 5,6-di(hydroxyalkyl) bicyclo[2.2.1]hept-2-enes wherein each hydroxyalkyl group contains up to about 20 carbon atoms, said polymers consisting of repeating 5,6-di(hydroxyalkyl) substituted bicycloheptanylene units joined directly to one another at the 2 and 3 positions.

8. Normally solid polymers of 5-epoxyalkylbicyclo[2.2.1]hept-2-enes wherein the epoxyalkyl group contains up to about 20 carbon atoms, said polymers consisting of repeating 5-epoxyalkyl substituted bicycloheptanylene units joined directly to one another at the 2 and 3 positions.

9. Normally solid polymers of 5-isocyanatoalkylbicyclo[2.2.1]hept-2-enes wherein the isocyanatoalkyl group contains up to about 20 carbon atoms, said polymers consisting of repeating 5-isocyanatoalkyl substituted bicycloheptanylene units joined directly to one another at the 2 and 3 positions.

10. A normally solid homopolymer of bicyclo[2.2.1] hept-2-ene composed of repeating bicycloheptanylene units joined directly to one another at the 2 and 3 positions.

11. A normally solid homopolymer of 5-hydroxymethylbicyclo[2.2.1]hept-2-ene composed of repeating 5-hydroxymethyl substituted bicycloheptanylene units joined directly to one another at the 2 and 3 positions.

12. A normally solid homopolymer of 5,6-di(hydroxymethyl)bicyclo[2.2.1]hept-2-ene composed of repeating 5,6-di(hydroxymethyl) substituted bicycloheptanylene units joined directly to one another at the 2 and 3 positions.

13. A normally solid homopolymer of 5-chloromethylbicyclo[2.2.1]hept-2-ene composed of repeating 5-chloromethyl substituted bicycloheptanylene units joined directly to one another at the 2 and 3 positions.

14. A normally solid homopolymer of 5-cyanobicyclo[2.2.1]hept-2-ene composed of repeating 5-cyano substituted bicycloheptanylene units joined directly to one another at the 2 and 3 positions.

15. A normally solid homopolymer of 5-isocyanatomethylbicyclo[2.2.1]hept-2-ene composed of repeating 5-isocyanatomethyl substituted bicycloheptanylene units joined directly to one another at the 2 and 3 positions.

16. A process for the production of solid polymers of bicyclo[2.2.1]hept-2-enes composed of repeating structural units which comprise a bicycloheptanylene radical, said structural units being joined directly to one another at the 2-position and 3-position carbon atoms of said bicycloheptanylene radical, which process comprises polymerizing at least one bicyclo[2.2.1]hept-2-ene monomer, having hydrogen atoms attached to the 2-position and 3-position carbon atoms of the bicyclo[2.2.1]hept-2-ene ring and at least 4 hydrogen atoms attached to the remaining carbon atoms of the bicyclo[2.2.1]hept-2-ene ring, in contact with a catalytically effective amount of a palladium compound capable of forming a substantially homogeneous phase with said monomer and wherein palladium exists in an oxidation state capable of forming $DSP^2$ hybrid orbitals.

17. The process of claim 16 wherein the polymerization is carried out at a temperature of from about −50° C. to about 170° C.

18. The process of claim 16 wherein the polymerization is carried out at a temperature of from about 0° C. to about 150° C.

19. The process of claim 17 wherein the amount of said palladium compound is from about 0.0001 to about 20 parts per 100 parts by weight of the said bicyclo[2.2.1]hept-2-ene monomer.

20. The process of claim 17 wherein the amount of palladium compound is from about 0.01 to about 5 parts per 100 parts by weight of the said bicyclo[2.2.1]hept-2-ene monomer.

21. The process of claim 17 wherein said bicyclo[2.2.1]hept-2-ene monomer has a molecular weight of less than about 500.

22. The process of claim 17 wherein said palladium compound is dichloro bis(benzonitrile)palladium.

23. The process of claim 17 wherein said palladium compound is dichloro bis(triphenylphosphine)palladium.

24. The process of claim 17 wherein said palladium compound is dichloro (5-vinylbicyclo[2.2.1]hept-2-ene) palladium.

25. The process of claim 17 wherein said palladium compound is dichloro (endo-dicyclopentadiene)palladium.

26. The process of claim 17 wherein said palladium compound is palladium diacetate.

27. The process of claim 17 wherein said bicyclo[2.2.1]hept-2-ene monomer is a 5-hydrocarbyl-bicyclo[2.2.1]hept-2-ene wherein the hydrocarbyl group contains up to about 20 carbon atoms.

28. The process of claim 17 wherein said bicyclo[2.2.1]hept-2-ene monomer is a 5,6-di(hydrocarbyl)-bicyclo[2.2.1]hept-2-ene wherein each hydrocarbyl group contains up to about 20 carbon atoms.

29. The process of claim 17 wherein said bicyclo[2.2.1]hept-2-ene monomer is a 5-alkyl-bicyclo[2.2.1]hept-2-ene wherein the alkyl group contains up to about 20 carbon atoms.

30. The process of claim 17 wherein said bicyclo[2.2.1]hept-2-ene monomer is a 5-haloalkyl-bicyclo[2.2.1]hept-2-ene wherein the haloalkyl group contains up to about 20 carbon atoms.

31. The process of claim 17 wherein said bicyclo[2.2.1]hept-2-ene monomer is a 5-hydroxyalkyl-bicyclo[2.2.1]hept-2-ene wherein the hydroxyalkyl group contains up to about 20 carbon atoms.

32. The process of claim 17 wherein said bicyclo[2.2.1]hept-2-ene monomer is a 5,6-di(hydroxyalkyl)-bicyclo[2.2.1]hept-2-ene wherein each hydroxyalkyl group contains up to about 20 carbon atoms.

33. The process of claim 17 wherein said bicyclo[2.2.1]hept-2-ene monomer is a 5-epoxyalkyl-bicyclo[2.2.1]hept-2-ene wherein the epoxyalkyl group contains up to about 20 carbon atoms.

34. The process of claim 17 wherein said bicyclo[2.2.1]hept-2-ene monomer is a 5-isocyanatoalkyl-bicyclo[2.2.1]hept-2-ene wherein the isocyanatoalkyl group contains up to about 20 carbon atoms.

35. The process of claim 17 wherein said bicyclo[2.2.1]hept-2-ene monomer is bicyclo[2.2.1]hept-2-ene.

36. The process of claim 17 wherein said bicyclo[2.2.1]hept-2-ene monomer is 5-hydroxymethylbicyclo[2.2.1]hept-2-ene.

37. The process of claim 17 wherein said bicyclo[2.2.1]hept-2-ene monomer is 5,6-di(hydroxymethyl)bicyclo[2.2.1]hept-2-ene.

38. The process of claim 17 wherein said bicyclo[2.2.1]hept-2-ene monomer is 5-chloromethylbicyclo[2.2.1]hept-2-ene.

39. The process of claim 17 wherein said bicyclo[2.2.1]hept-2-ene monomer is 5-cyanobicyclo[2.2.1]hept-2-ene.

40. The process of claim 17 wherein said bicyclo[2.2.1]hept-2-ene monomer is 5-isocyanatomethylbicyclo[2.2.1]hept-2-ene.

References Cited

UNITED STATES PATENTS

| | | | |
|---|---|---|---|
| 2,721,189 | 10/1955 | Anderson | 260—93.1 |
| 2,831,037 | 4/1958 | Schmerling | 260—93.1 |
| 2,932,630 | 4/1960 | Robinson et al. | 260—93.1 |

JOSEPH L. SCHOFER, *Primary Examiner.*

L. EDELMAN, *Assistant Examiner.*